Oct. 14, 1958 M. WATTER 2,856,079

ARTICLE HANDLER

Filed April 15, 1955 15 Sheets-Sheet 1

INVENTOR

Michael Watter

BY Wm. R. Glisson

ATTORNEY

Oct. 14, 1958 M. WATTER 2,856,079

ARTICLE HANDLER

Filed April 15, 1955 15 Sheets-Sheet 2

INVENTOR

Michael Watter

BY

Wm. R. Glisson

ATTORNEY

Oct. 14, 1958

M. WATTER 2,856,079

ARTICLE HANDLER

Filed April 15, 1955

15 Sheets-Sheet 3

INVENTOR

Michael Watter

BY

Wm. R. Glisson

ATTORNEY

Oct. 14, 1958 M. WATTER 2,856,079

ARTICLE HANDLER

Filed April 15, 1955 15 Sheets-Sheet 4

INVENTOR
Michael Watter
BY
Wm. R. Glisson
ATTORNEY

Oct. 14, 1958 M. WATTER 2,856,079

ARTICLE HANDLER

Filed April 15, 1955 15 Sheets-Sheet 5

INVENTOR
Michael Watter

BY
Wm. R. Glisson
ATTORNEY

INVENTOR
Michael Watter
BY
Wm. R. Glisson
ATTORNEY

Oct. 14, 1958 M. WATTER 2,856,079

ARTICLE HANDLER

Filed April 15, 1955 15 Sheets-Sheet 7

INVENTOR

Michael Watter

BY

Wm. R. Glisson

ATTORNEY

ARTICLE HANDLER

INVENTOR
Michael Watter
BY
Wm. R. Glisson
ATTORNEY

INVENTOR
Michael Watter
BY
Wm. R. Glisson
ATTORNEY

Oct. 14, 1958 M. WATTER 2,856,079

ARTICLE HANDLER

Filed April 15, 1955 15 Sheets-Sheet 10

INVENTOR

Michael Watter

BY

Wm. R. Glisson

ATTORNEY

INVENTOR
Michael Watter
BY
Wm. R. Glisson
ATTORNEY

Oct. 14, 1958 M. WATTER 2,856,079

ARTICLE HANDLER

Filed April 15, 1955 15 Sheets-Sheet 12

INVENTOR

Michael Watter

BY

Wm. R. Glisson

ATTORNEY

INVENTOR
Michael Watter
BY
Wm. R. Slisson
ATTORNEY

INVENTOR
Michael Watter
BY
Wm. R. Glisson
ATTORNEY

INVENTOR
Michael Watter
BY
Wm. R. Glisson
ATTORNEY

United States Patent Office 2,856,079

Patented Oct. 14, 1958

2,856,079

ARTICLE HANDLER

Michael Watter, Philadelphia, Pa., assignor to The Budd Company, Philadelphia, Pa., a corporation of Pennsylvania Application April 15, 1955, Serial No. 501,586

16 Claims. (Cl. 214—1)

This invention relates to server or handler apparatus for transferring articles from one machine or position to another and has for an object the provision of improvements in this art.

The invention is in some respects related to that disclosed in my copending application Serial No. 475,498, filed December 15, 1954, now Patent No. 2,815,866, December 10, 1957.

One of the particular objects of the invention is the provision of relatively simple apparatus which will move articles under positive positional control from one machine or position to another.

Another object is to provide means for handling articles of relatively complex shape.

Another object is to provide improved means for holding an article and means for shifting it from one holding means to another.

Another object is to provide improved guide means for supporting an article while it is being moved, the guide means including extensible and retractible elements and also foldable elements for bridging a gap or for movement to clear adjacent parts when the server is being moved or when it is out of use.

The above and other objects of the invention will be apparent from the following description of certain exemplary embodiments, reference being made to the accompanying drawings wherein.

*General Organization*

Figure 1:
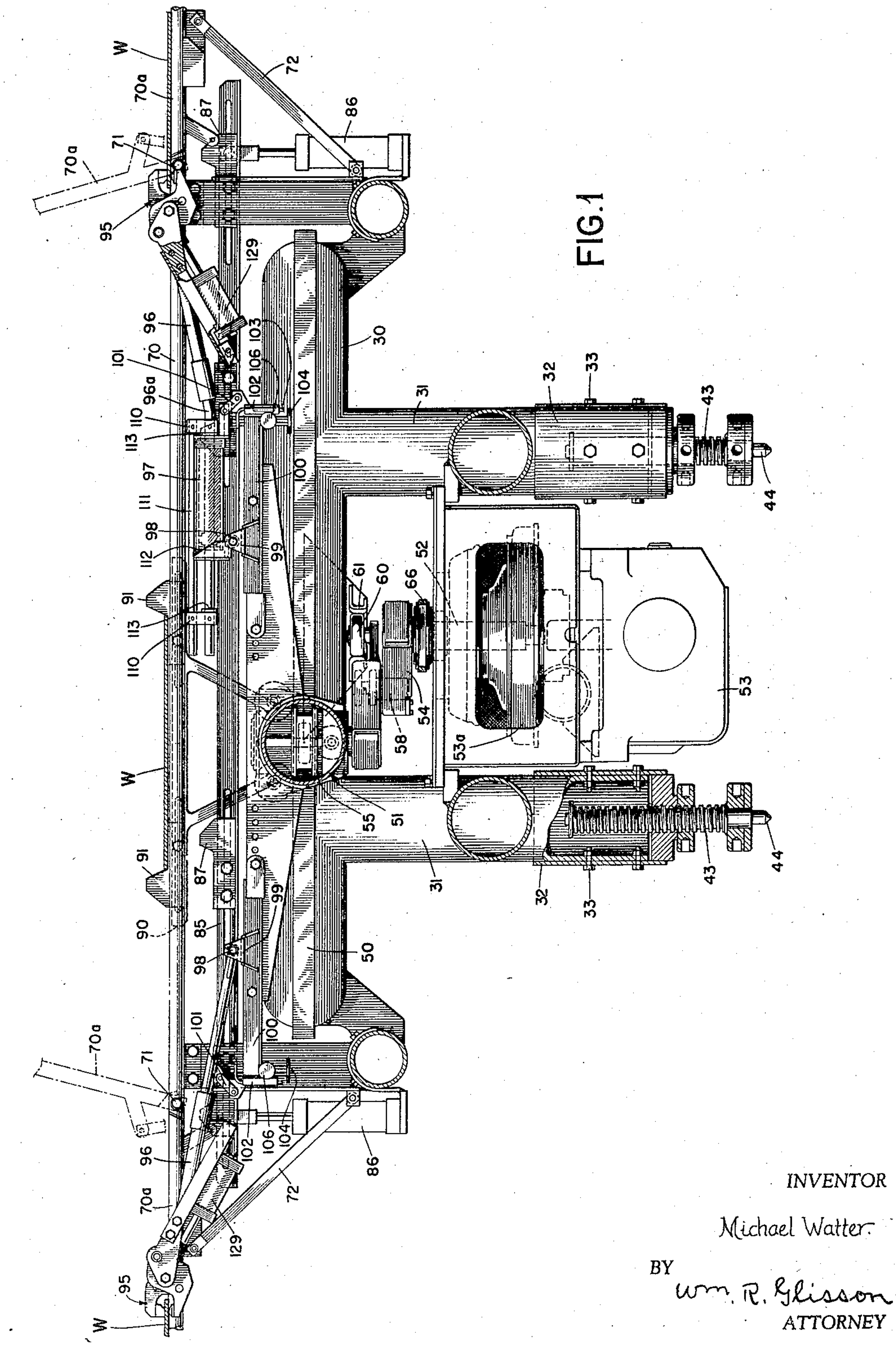
Fig. 1 is a vertical longitudinal section through a machine embodying the invention, the view being taken on the line 1—1 of Fig. 2.
Figure 2:
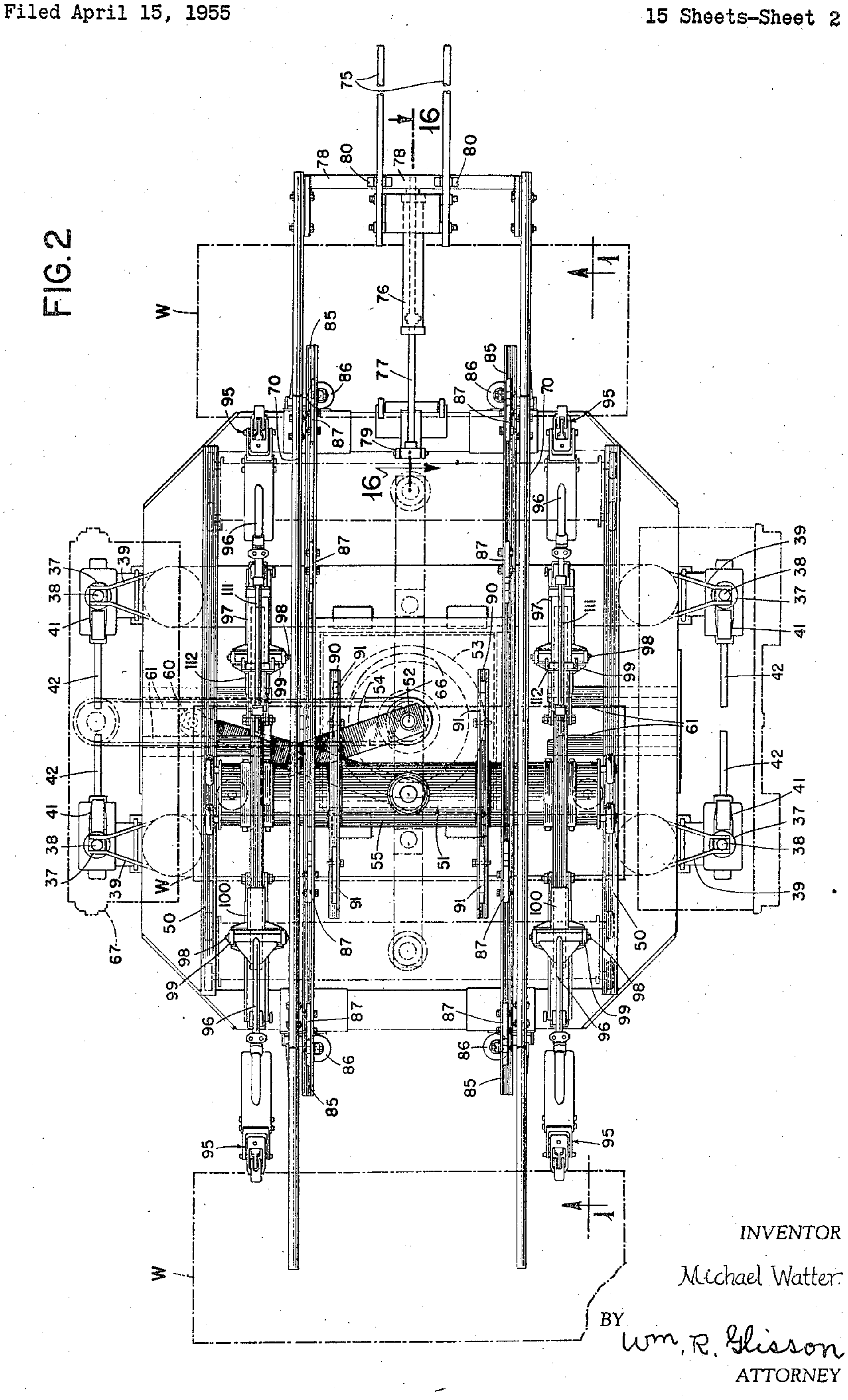
Fig. 2 is a top plan view of the machine shown in Fig. 1.
Figure 3:
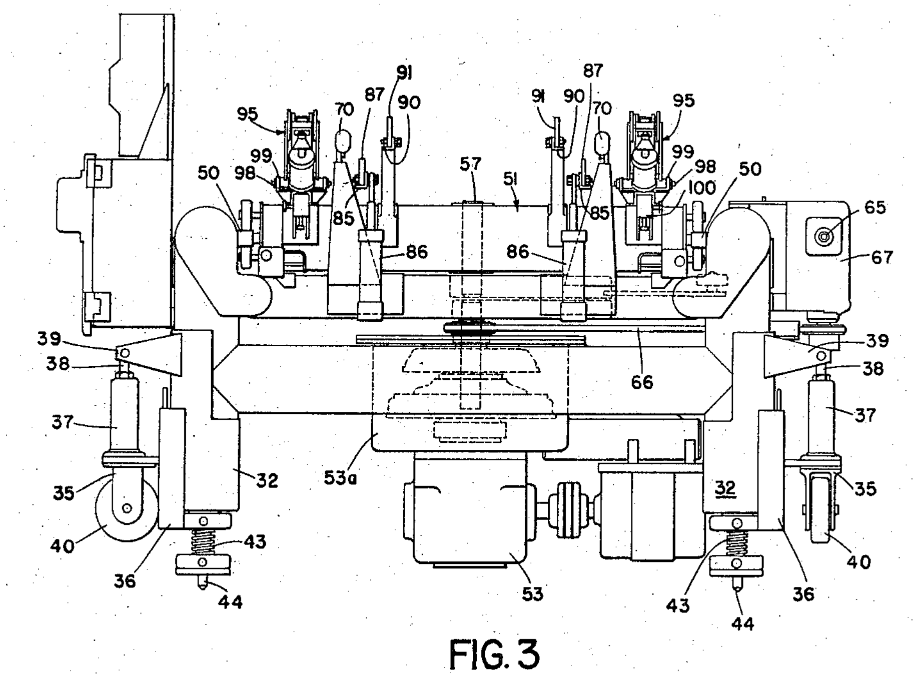
Fig. 3 is an end elevation of the same.

The several embodiments shown are all alike in their basic organization in that they include a reciprocating carriage having means to take an article from one machine and move it along rails to another machine or position together with travelling and non-travelling holders for transferring the article between them so as to move it in successive stages of travel and to hold it securely while halted between stages of travel.

In the first embodiment (Figs. 1–19), where a smooth sheet (i. e., not cupped) is handled, the sheet pull-out and push-in means comprise grippers for engaging the edge of the sheet. In the other embodiments, where the article has been cupped and presents a vertical transverse surface, vacuum cups are used for engaging the article.

In the first embodiment, the smooth sheet travels along fixed track rails in the embrace of a carriage holder and the non-travelling holders move the article up and down to permit the travelling carrier to move under it; in the other embodiments, where the article is channel-shaped with the open side down, both the travelling and non-travelling holders move up and down relative to the fixed track rails along which the article moves and upon which it rests while the transfer between travelling and non-travelling holders is being made.

In the first and second embodiments, the handler or server is disposed between two machines and has both pull-out and push-in functions; in the third embodiment, the article has been completed and only the pull-out side of the handler is needed to cooperate with a forming machine; the push-in side being replaced by take-off mechanism such as a conveyor.

*Main frame*

Referring to the first embodiment, Figs. 1–19, the server or handler illustrated comprises a main frame 30 having a number of legs 31 provided each with a foot unit 32 which telescopically fits the leg and is secured thereto by bolts 33 entered in a selected set of holes in the leg. Each foot unit comprises a caster mounting 35 movable up and down in guides 36 and a jack 37 having its stem 38 connected to a bracket 39 for moving the caster 40 and its mounting up and down on the foot unit. In the present instance a hydraulic jack is used and has associated with it a fluid pump 41 having an operating handle 42. In the foot unit there is threaded the stem 43 of a foot pad 44 which is brought down to rest on the floor after the handler has been moved on its casters. Normally the handler is set up in proper working position on the pads 43 and they are locked in position. When the handler is to be moved, the casters are forced down to raise it off its pads and when the handler is brought back into operating position the casters are raised and the handler set back down on its pads. By marking the spots where the pads stand on the floor, the correct operating position of the handler is established and it is necessary to make only one operating set-up adjustment. The machine also may be picked up and moved by a crane or the like.

*Carriage operating means*

Figure 31:
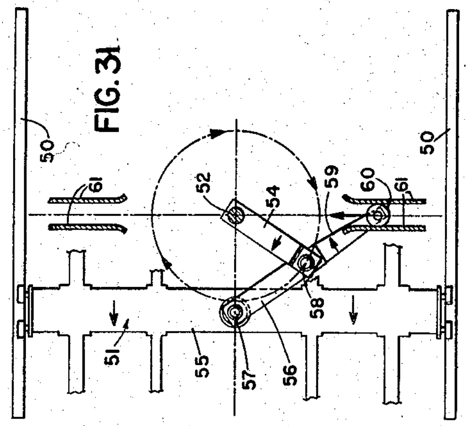
Fig. 31 is a view like Fig. 29 but showing the carriage at one side of and near mid-stroke position.
Figure 30:
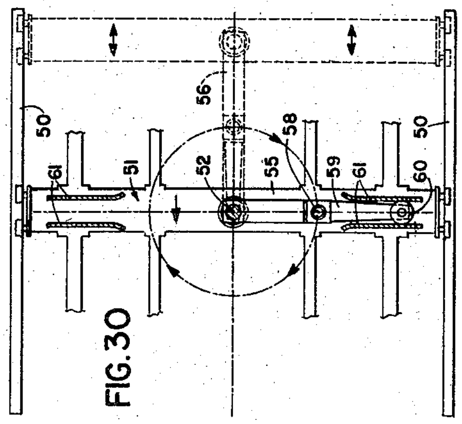
Fig. 30 is a view like Fig. 29 but showing the carriage at mid-stroke position.
Figure 29:
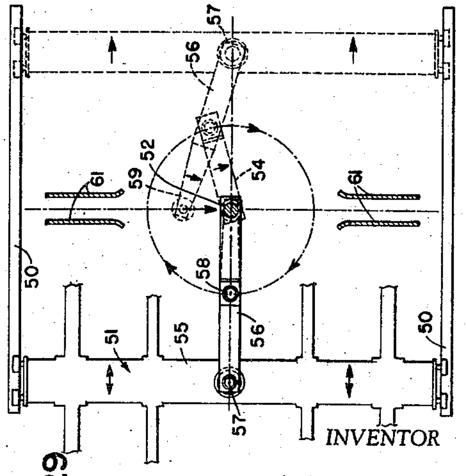
Fig. 29 (on the sheet with Fig. 20) is a diagrammatic plan view of the carriage operating mechanism, shown at the rest position of Fig. 4 or Fig. 23.
Figure 21:
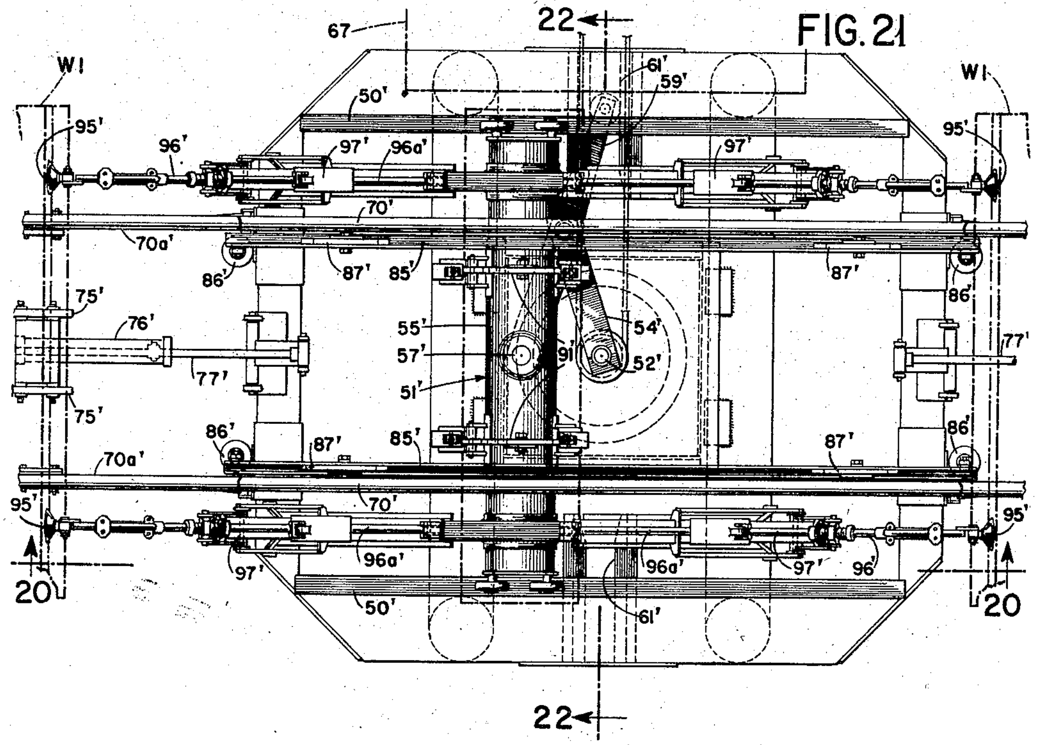
Fig. 21 is a top plan view of the machine shown in Fig. 20.
Figure 22:
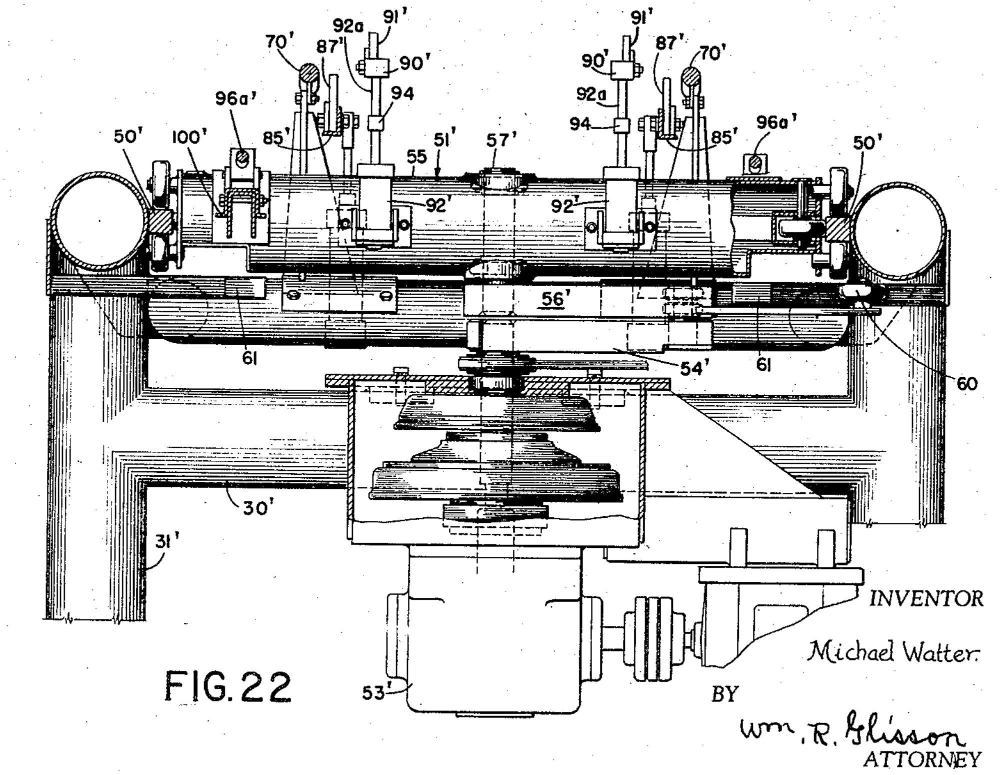
Fig. 22 is a transverse section taken on the line 22—22 of Fig. 21.

The main frame 30 is provided with ways 50 upon which is mounted a reciprocable carriage 51. The carriage is reciprocated by any suitable means, such, for example, as that disclosed in my copending application Serial No. 394,397, filed November 25, 1953, now Patent No. 2,711,101. As here shown (see also Figs. 29–31), the reciprocating mechanism comprises a crankshaft 52 operated by a motor drive unit 53, this unit including besides the motor a reduction gear unit and a clutch-brake device 53*a* by which the operation can be precisely controlled.

The shaft 52 turns a crank arm 54 which is connected to the rigid tubular cross beam 55 of the carriage by a connecting rod 56. At the carriage the connecting rod 56 turns on a pin 57 and at the crank arm the connecting rod turns about a crank pin 58. At the crank pin 58 a cam arm 59 extends reversely from the connecting rod 56 and on its outer end carries a cam roller 60 which cooperates with open flared-end cams 61 which are fixed to the frame at each side on a transverse line passing through the crankshaft axis. By this arrangement the carriage is reciprocated past the crankshaft axis, the cam arm moving it past central position where the connecting rod drive is ineffective.

Electrical controls are provided for coordinating the action of various elements of the machine and the action of these controls is tied in with the action of the carriage through the operation of a camshaft 65 driven positively from the crankshaft and at the same speed through a sprocket belt 66 or the like. The electrical controls are located in a panel box 67 at the other side of the handler.

*Workpiece supporting rails*

Normally fixed but vertically adjustable track rails 70 are secured on the main frame at an elevation above the carriage to support the article or workpiece W which here has the form of a smooth sheet bent down in the middle. The ends 70*a* of the track rails 70 are hinged, as at 71, to allow them to swing up out of the way when the handler is to be moved. In their lowered position the ends 70*a* are supported by inclined braces 72.

*Bridge rails*

Extensible and retractible bridging rails 75 (Figs. 2, 16–19) are provided at one or both ends of the handler, depending on whether they are needed, for supporting the article as it moves between the handler and the served machine. These bridging rails reach places where fixed rails would interfere with the moving parts of the served machine, the movable rails being extended when the served machine parts are retracted and being withdrawn before the served machine parts act on the workpiece.

The extensible or supplemental track rails 75 are operated by a power device 76, here a fluid-operated cylinder-piston device having a fixed piston rod 77 and a movable cylinder. At its outer end the piston rod is secured to a cross bar 78 secured between the hinged ends 70*a* of the track rails 70 and at its inner end is hinged to a bracket 79 secured to the main frame. The auxiliary rails are thus adapted to be swung up with the hinged ends of the main track rails. The supplemental rails 75 slide on guides 80 carried by the cross bar 78; hence all parts swing up together when the main track rails are swung up. The extended position of the bridge rails is adjusted by adjustable clamps 81 on the cylinder which secure the rails to the cylinder. The height of the cross bar 78 and bridge rails 75 carried thereon is adjustable by clamps 82 carried by the bar 78 and secured to depending slotted projections 83 carried by the rail extensions 70*a*.

*Vertically movable bars*

Means are provided for moving the workpiece up and down relative to the fixed track rails 70 so that the travelling article holders may move beneath the article on a return stroke. The means herein provided for raising and lowering the workpiece at the fixed positions or index stations comprises a bar 85 on each side between the rails 70, a bar at each side being actuated by reciprocating power devices 86, including a cylinder and piston, which are mounted on a cross bar of the main frame. At each end the bars carry longitudinally adjustable standards or guides 87 adapted to embrace the front and rear edges of the workpiece. The standards are tapered on the inner sides to guide the workpiece down to a precise position.

*Carriage bars*

Means are provided for holding a workpiece on the carriage so that it moves with the carriage along the fixed track rails, the means here shown comprising bars 90 secured at each side to the cross beam of the carriage and having standards or guides 91 adjustably secured thereto so as to embrace the leading and trailing edges of the workpiece. The inner edges of the standards are tapered to guide the workpiece down to precise position.

*Workpiece engaging means—grippers—programming*

Means are provided for engaging and moving the workpiece out of one forming machine at one end of the handler and for moving it into another machine at the other end of the handler. The workpiece engaging means also has movement relative to the carriage so that the total movement of the engaging means and the workpiece is greater than the length of movement of the carriage. This overtravel, which is subject to length adjustment, may be referred to as programming. One form of apparatus for providing such movement is disclosed in the first copending application referred to above.

In the first embodiment, where the article to be handled is smooth and bent in only one plane, the article engaging means comprise grippers or hands 95 carried on the outer ends of arms 96. The arms 96 on the push-in end (and on the pull-out end also if the press requires it) are extended and retracted each by a power device, here a cylinder-piston device 97 in which the arm 96 is formed as a continuation of the piston rods **96*a***.

There are two such feed hands at each end of the machine and the two operate together. The cylinders 97 (at the right of Fig. 1) or the arms 96 (shown at the left of Fig. 1) are fixed on the carriage with provision for vertical adjustment of the outer ends of the arms. As shown, a cylinder (or arm) is hinged at its rear end on a pivot shaft 98 to brackets 99 carried by a base plate 100 which is secured fast on the carriage. At the front end of the cylinder (or at a point along the arm) there is a link connection 101 with a vertically movable slide 102 mounted in a guide 103 carried by the base plate 100. A hand screw 104 threaded in the plate and turnable in a projection of the slide serves to move the front end of the cylinder (or arm) up and down. A hand lock screw 106 holds the hand screw 104 in adjusted positions.

The piston rod **96*a* and hand are held against turning in the cylinder by yokes 110 secured to each end and between them carrying a guide rod 111 which moves in guides 112 formed on the heads of the cylinder. The yokes 110 are adjustably connected to both cylinder rod and guide rod and carry bumper pads 113** which cooperate with the cylinder ends so that the piston rod may be adjusted for any desired length of stroke toward either end of the cylinder. With length adjustment and height adjustment of the separate cylinders, a wide range of adaptation for orientation at the presses is provided.

Each gripper 95 is adapted to open and close to grip the edge of the sheet and has some free vertical movement to adapt itself to the position of the edge of the sheet as it grips it.

*Grippers*

As shown in Figs. 8–15, the gripper comprises a base 116 of inverted channel shape which is secured to the end of the arm 96 by welding, as at 117. A bifurcated gripper support 118 is secured to the base 116, as by bolts 119. A lower jaw 120 is pivotally connected at 121 to the side plates or furcations **118*a* of the support 118 and at the sides has elongated slots 122 embracing rollers 123 carried by pins 124 secured to the side plates 118*a***.

An upper jaw 125 is pivoted to the lower jaw at 126 and at 127 is pivotally connected to the outer end of a jaw-operating piston rod 128. The piston rod is operated by a piston in a cylinder 129 pivoted at its rear end at 130 to a bracket 131 bolted to the base 116. The jaws are provided with pads 132, as of nylon or other suitable material, for securely gripping the sheet without marring it.

It will be seen that when the gripper approaches a sheet edge, the upper jaw is swung far back and the lower jaw stands below any position which the edge of the sheet is likely to assume. When the piston rod moves out, it swings the upper jaw over against the top of the sheet and by further movement swings the lower jaw up against the bottom of the sheet to grip it against the upper jaw. When the gripper releases the sheet the jaws resume their original positions. The upper jaw is now fully clear of the sheet so the sheet can be moved up, as previously described.

*Second embodiment*

The second embodiment (Figs. 20–28) is like the first in most of its parts and functions, and the parts will be designated by the same reference characters as in the first embodiment but with a prime (′) added. The second form is different in that it handles parts of a different shape and has been altered to handle the channel-shaped section which the workpieces W1 now assume.

*Suction cups*

Figure 32:
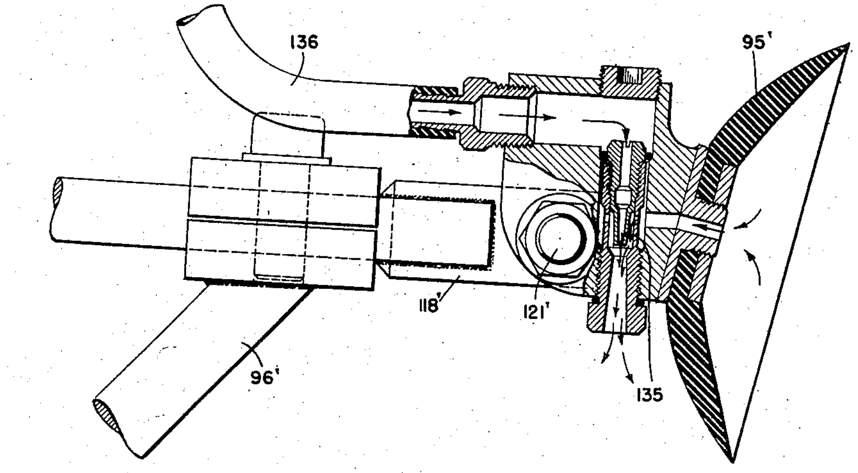
Fig. 32 (on the sheet with Fig. 3) is a section through a suction cup of Fig. 20.

Instead of hands or grippers 95 of the first form, the arms 96′ now carry suction cups 95′ mounted to turn to some extent about a horizontal pivot pin 121′ carried by a support 118′. The suction is created by the injector principle and for this purpose (Fig. 32) the suction cup is provided with an injector 135 served by a compressed air line 136 under the control of suitable valve means as shown in the wiring diagram.

*Arm lift means*

Another difference is that while the cylinder-piston assembly 97, etc. of the first embodiment was only moved up and down for adjustment through slide 102 and link 101, the present cylinder-piston device 97′ hinged at 98′ is not only moved up and down for basic height adjustment, but is also moved up and down at each stroke to raise and lower the arms and cups to engage or pass the channel-shaped workpiece. For this purpose the link 101 is replaced by a cam device 101′ which is secured to a projection 100′ carried by the carriage and the cylinder carries a cam roller 137 which moves along the cam. The rod 96′ has vertical adjustment relative to the cylinder by means generally denoted by the numeral 138.

*Carriage lift bars*

Another difference is that while in the first embodiment only the lift bars 85 moved up and down, in the second embodiment the carriage bars 90′ also move up and down to accommodate for the deep channel-shaped workpiece W1. For this purpose the bars 90′ on the carriage are provided with cylinder-piston devices 92. One of the power devices may be pivotally connected, as at 93, to a bracket on the carriage cross beam 55′. Adjustable stop collars 94 are provided on the piston rods **92*a* for controlling the length and range of vertical movement of the bars 90′. The workpiece guides 91′** are of the inside-fitting type and are adjustable along the length of the bars.

The guides 87′ of the lift bars 85′ are also of the inside-fitting type and adjustable along the length of the bars.

*Arm length adjustment*

The suction cup mounting arms or bars 96′ preferably are adjustable along their length, as at **96*b***, to fit different locations of the side of the workpiece in the press.

*Third embodiment*

The third embodiment (Figs. 33–38) is in many respects like the second embodiment and basically in frame, carriage and operation is like the first embodiment, and the same reference characters will be used for like parts but with a double prime (″) added.

The principal difference between the third form and the second form is that in the third form the article holding means, here the suction cups 95″ and arms 96″, are provided on only one end of the handler and a conveyor belt 140 is provided at the other end. The belt could be oriented in various directions according to need but here is arranged to take articles out laterally so is mounted in a trough 141 which is directed to the side. Rolls 142 at the ends of the trough support the belt and one of the rolls 142 is driven by a motor gear unit 144. Since the belt can travel continuously, the motor unit can run continuously once a run is started, the motor unit running independently of the drive for the handler carriage and other intermittently operating parts.

One of the fixed track rails 70'' is shortened and bent down to allow one end of the workpiece to drop down on the belt, the belt then pulling the other end off the other rail.

The workpiece exchange on the rails is required at only one end so the lift bars 85'' are hinged at the belt end on fixed pivots **85*a* and are swung up and down at the other end by the cylinder-piston devices 86''** at that end.

The workpiece holding guides 91'' of the carriage are of the inside type, as in the second form, but the carriage is employed to push workpieces W3 along the rails 70'', so for this purpose supplemental pusher elements **91*a* are provided on the carriage bars 90''**.

The bridge rail means and the operating means therefor are as shown for the other forms. The arms on the pull-out side and their operation by cylinders and cams are like those of the second form.

*Operation—second form—general*

The operation of the second form will be explained by reference to the wiring diagram. This form is selected because it has more powered elements than the other forms and its operation generally embraces the operation of the other forms.

The rest position of the machine (Fig. 23) is about at the 300° point on its crankshaft circle, the 0° position being taken as the end of the carriage stroke toward the press on the pull-out end.

The first action (Fig. 24) is a movement of the carriage from the 300° rest position toward the press on the pull-out end. As the carriage moves out, the article carrying arms 96' on the pull-out end move up and out toward the press for bringing the article-engaging means (here vacuum cups 95') into position for engagement with the article.

During the same time the bridge rails 75' on the pull-out end are pushed out toward the press.

Shortly after the carriage starts moving and at about the 0° position, the arms on the push-in end move out and up (Fig. 24) to engage an article which is resting on the track rails 70' at the second fixed index station, the fixed-station guides being at that time in the act of moving down to release the article.

The carriage guides move up (Fig. 25) to engage an article resting on the rails at the first fixed index station as the guides of the fixed station move down to place it on the rails and disengage it.

The parts pause at the 360° or 0° position and at the 180° position to assure proper transfer of the three workpieces which are to be moved by the carriage on its forward stroke, also proper clearance of press parts from the article. The article engaging means are energized to engage articles on both pull-out and push-in ends as the article engaging means (here suction cups) arrive in proper position.

On the forward stroke (from the 0° to 360° position toward the 180° position) the bridge rails 75' on the pull-out end are moved in away from the press on that end and the bridge rails on the push-in end are moved out by means on the handler toward the press on that end; that is, they are moved out by means on the handler unless they have already been moved by other means which will be noted later.

The movement of the articles on both the pull-out end and the push-in end in indicated automatically by limit switches, to be described later, to assure that the articles are present and also that they are moving evenly and not at an angle.

Figures 26, 27, 28:
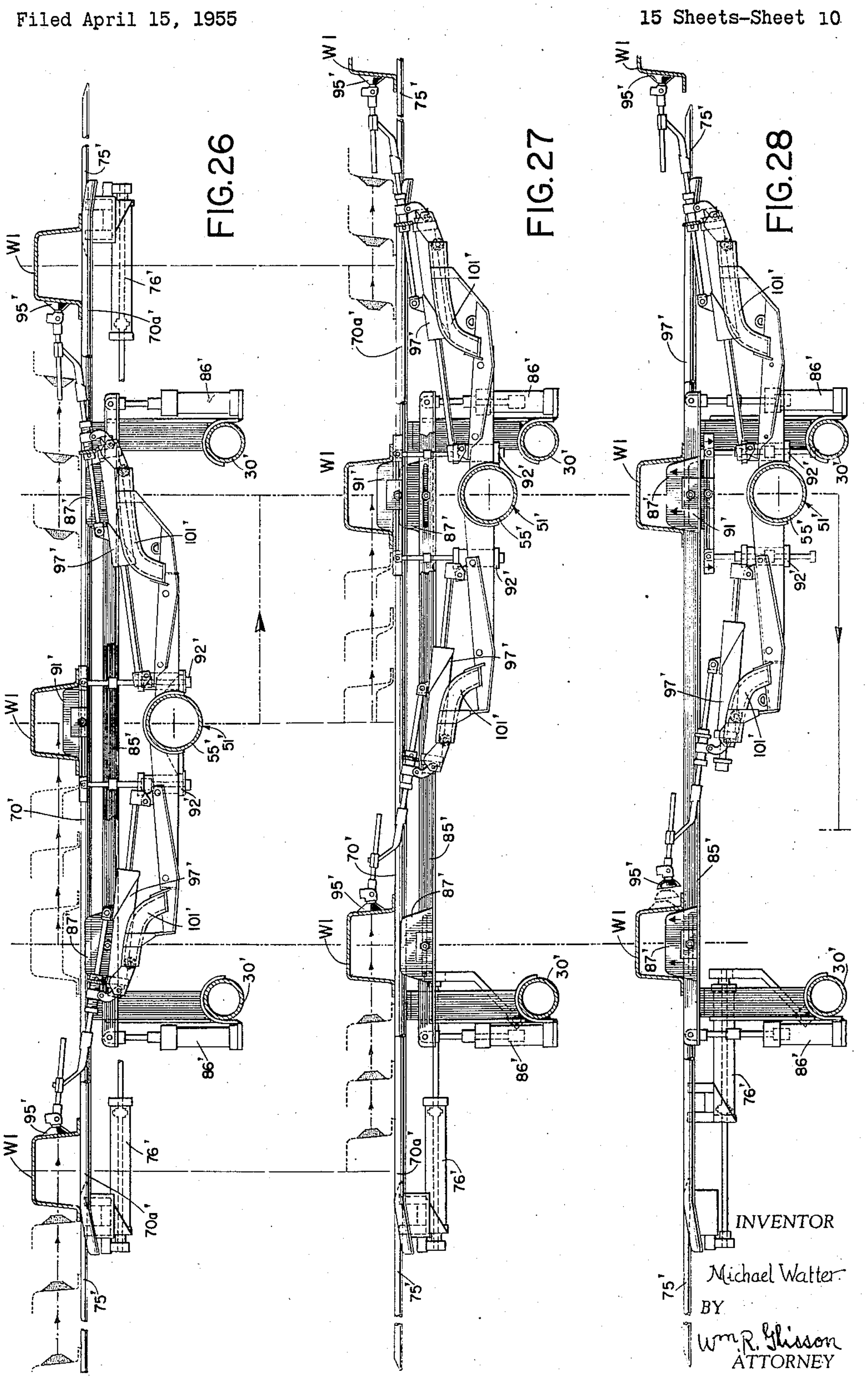
Fig. 26 is a view like Fig. 23 but showing the carriage near mid-stroke.
Fig. 27 is a view like Fig. 23 but showing the parts at the push-in end of the stroke.
Fig. 28 is a view like Fig. 27 but showing the workpieces released from the workpiece holding means on the carriage and two workpieces engaged by fixed-position holding means.
Figure 33:
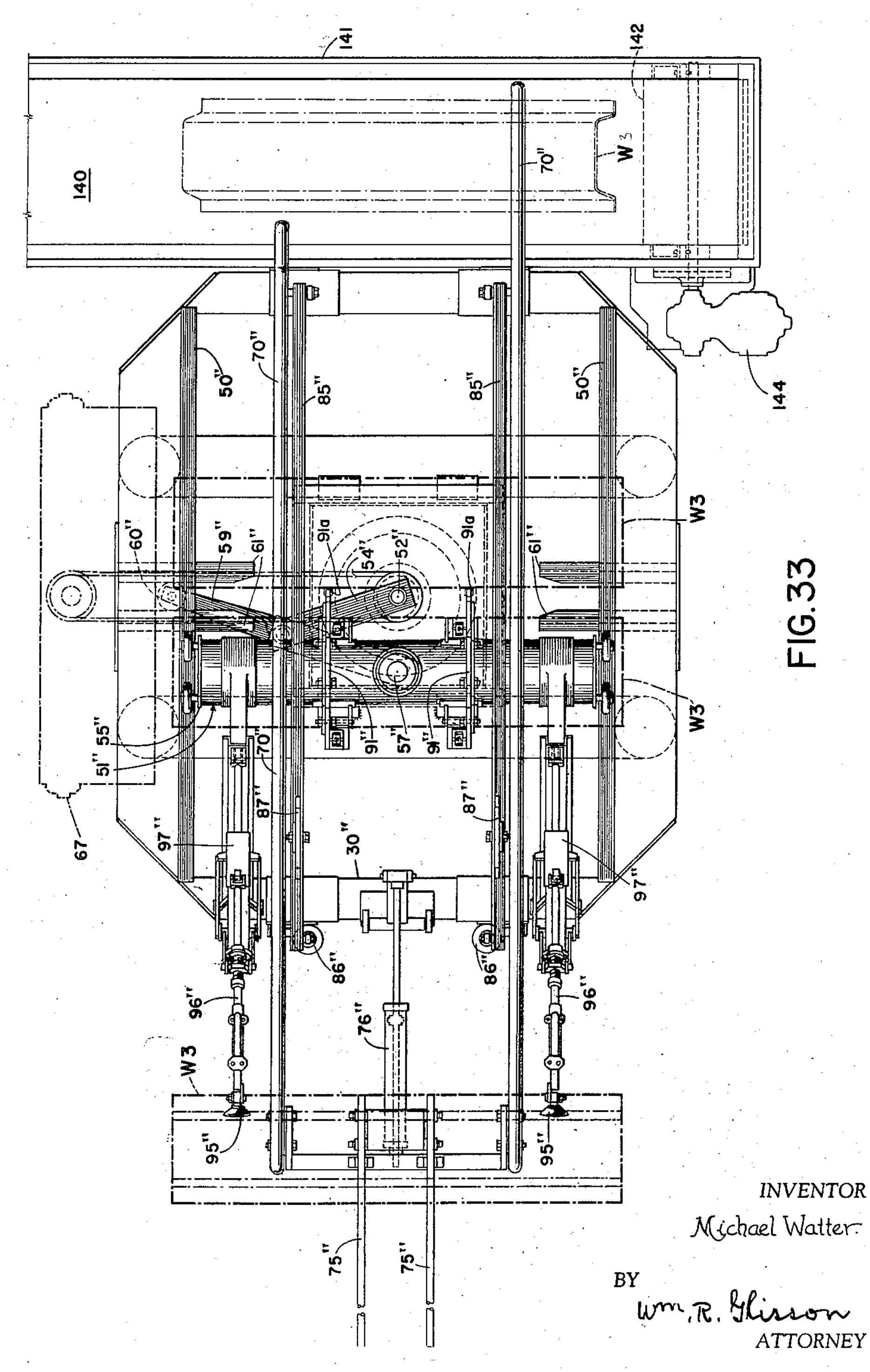
Fig. 33 is a plan view of another modification in which the push-in end of the machine has been altered to deliver the workpiece to transporting means instead of feeding it to another machine.

As the articles approach the 180° position the article engaging means release them. The article on the pull-out end continues to move on the rails by inertia into proper position where it is engaged by the guide means at the first fixed index station. The suction cups are still positioned in front of the article to prevent overtravel (Fig. 27). The article on the push-in end continues to move by inertia but the suction cups follow it to push it if necessary. The intermediate article which is being carried by the carriage guides is transferred to the fixed station guides at the second fixed index station at about the 180° position.

Figures 23, 24, 25:
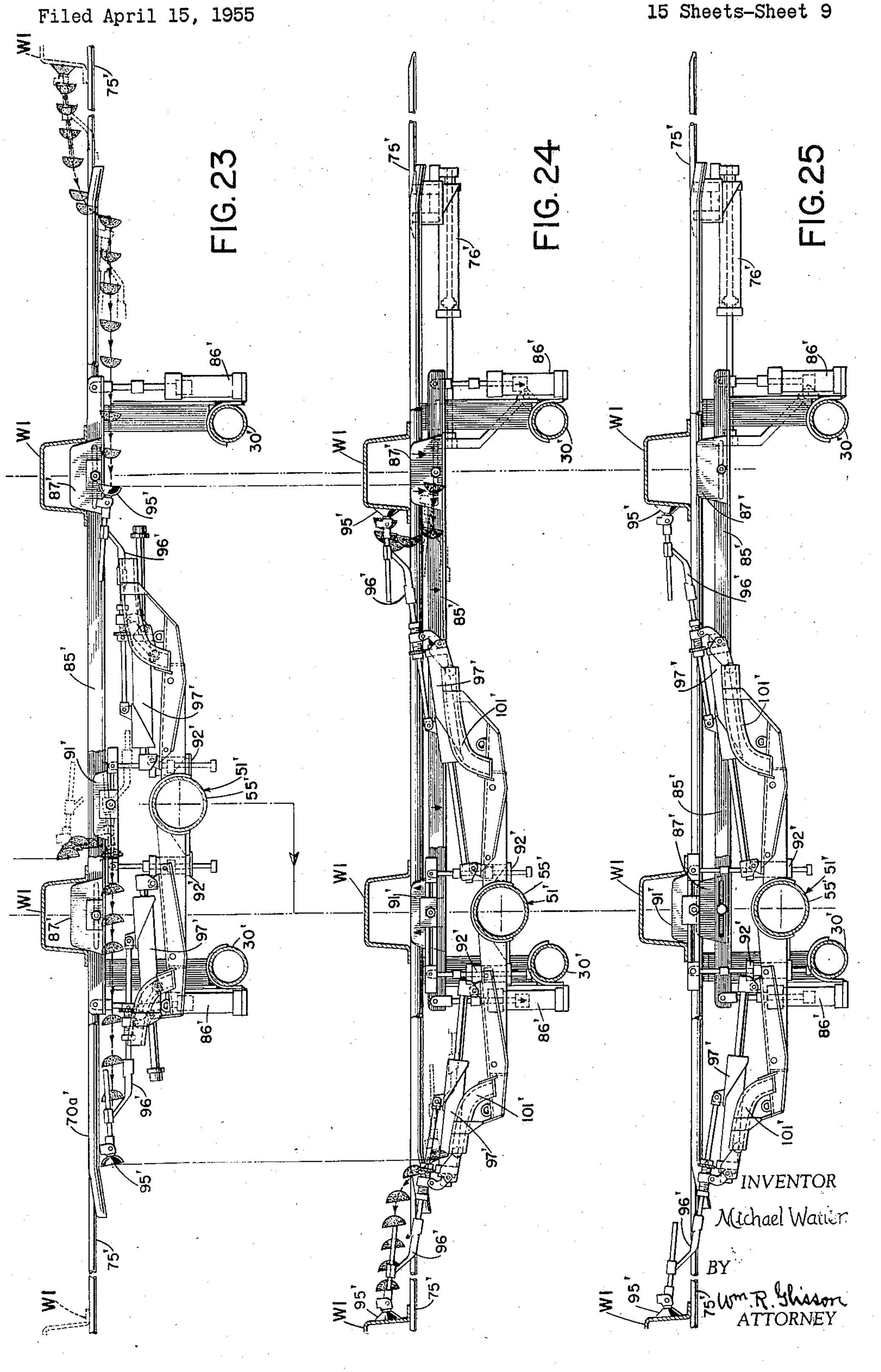
Fig. 23 is a diagrammatic view, like Fig. 20 but with parts omitted, showing the parts at the rest or pause position.
Fig. 24 is a view like Fig. 23 but with the parts at the pull-out end of the stroke and the suction cups in engagement with workpieces.
Fig. 25 is a view like Fig. 24 but with an intermediate workpiece engaged by seating means on the carriage.

As the carriage nears the 180° position on the forward stroke, the arm-retracting means of the pull-out arms are energized and before the carriage starts to return the pull-out arms are retracted and lowered (Fig. 28) so that the suction cups move back behind the bottom flange of the article and down below the article being held at the first fixed index station so as to pass under it on the return stroke. The push-in arms are retracted and lowered to pass beneath the article being held at the second fixed index station on the carriage return movement (Fig. 23).

*Motor run*

Figure 39A:
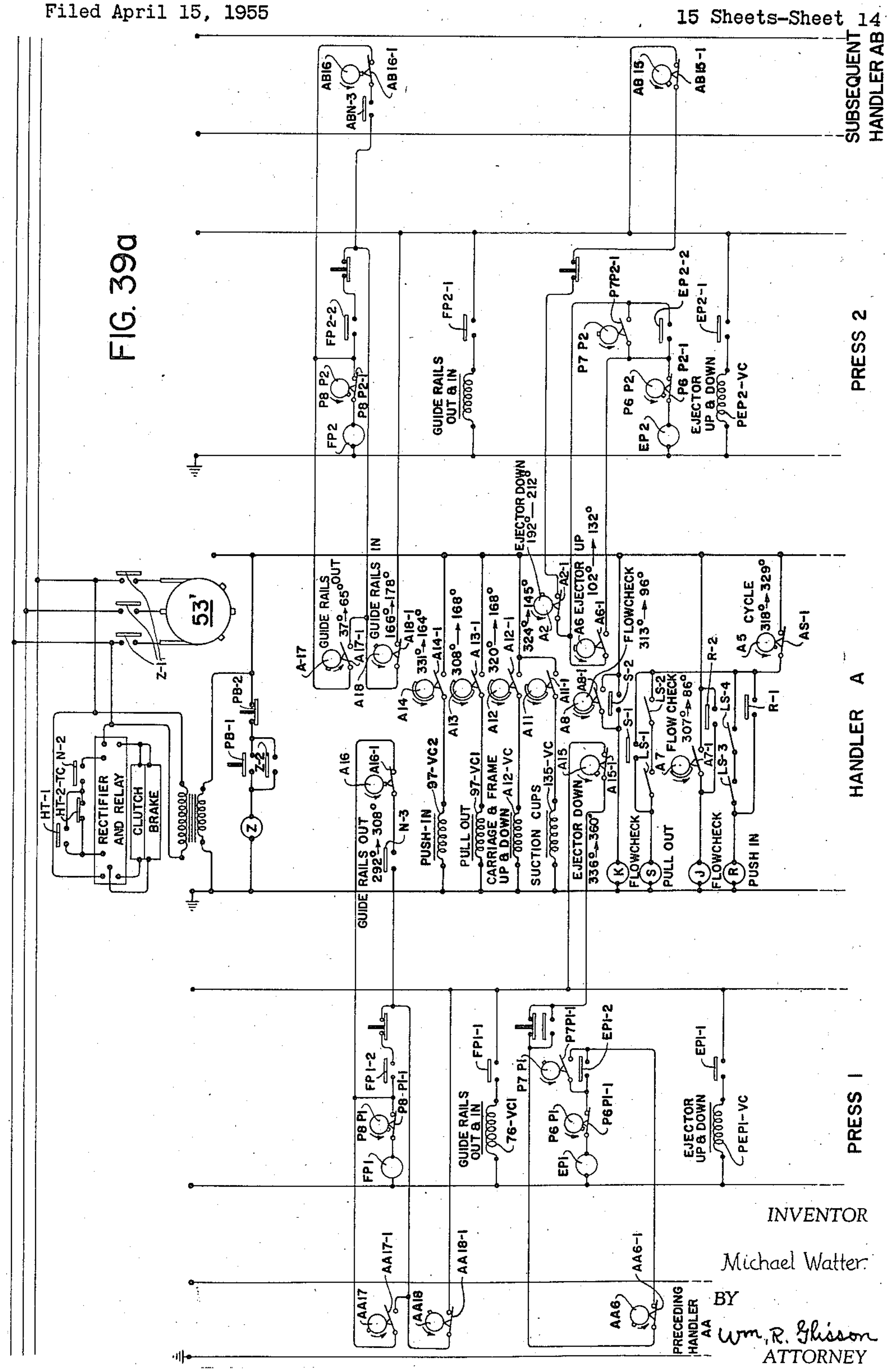
Fig. 39, comprising the parts **39*a* and 39*b*,** is a wiring diagram.
Figure 39B:
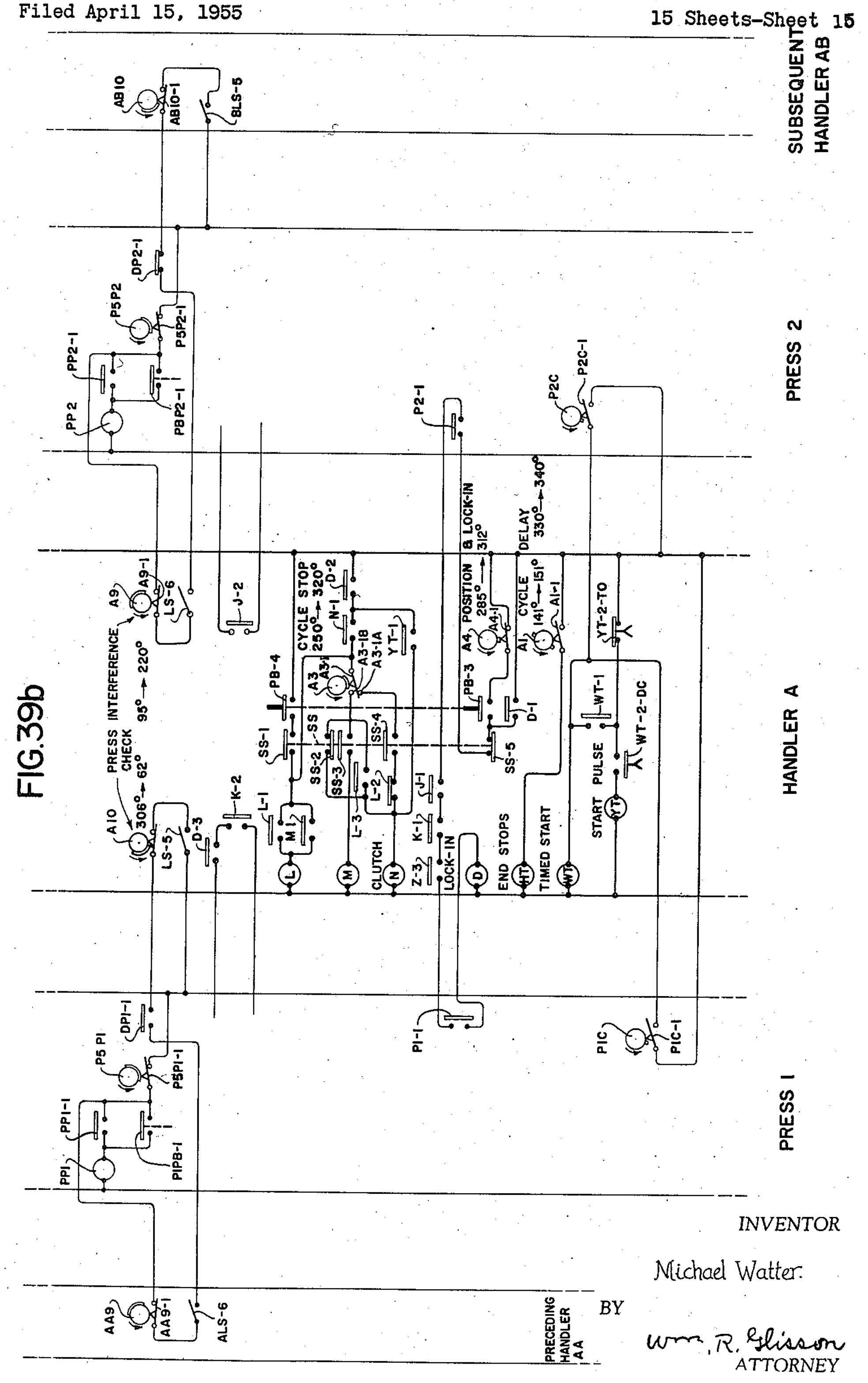

For any given run the carriage drive motor unit 53' is started and runs continuously. Its clutch **53*a*' is engaged for each cycle of operation and this engagement is dependent on the condition of the press P1 with which the pull-out arms cooperate and of the press P2** with which the push-in arms cooperate, if under automatic control, or on a manual impulse if under hand control. Reference is now made to Figs. 39*a* and 39*b* which will be described along with the cycle of operation. The motor is started by pressing a pushbutton PB–1 which energizes a relay Z to close a triple-blade switch Z-1 to start the motor and to close its own lock-in switch Z–2. There are certain safety devices to stop the motor, but these are not shown. The motor can be stopped at any time by opening a stop push-button PB–2 which deenergizes relay Z. The relay Z has another switch Z–3 in a lock-in start circuit, to be described later, to assure that the clutch cannot be operated unless the motor is running.

*Stop position*

As previously stated, the carriage is normally stopped after each cycle of operation at about the 300° crankshaft position where all parts of the handler stand clear of both presses P1 and P2. Here a workpiece W1 is positioned on the guides of each of the two fixed index stations. On the handler cams the zero position is shown at about 60° clockwise from the vertical; on the press cams the zero position is on the vertical line.

*In automatic, presses control server*

The carriage clutch operation is under the supervision of the presses being served. Before the clutch can be engaged, both presses must be in a safe position to cooperate properly with the server or handler. This is indicated by the closure of switch P1–1 of press P1 and switch P2–1 of press P2, both connected in the run lock-in circuit of the handler, as will be described.

*Flow control*

Also, it must be shown that workpieces have been properly moved by the pull-out and push-in arms and that the workpieces have been moved evenly. On the pull-out side a flow check cam switch A8–1 operated by a cam A8 of the handler is kept closed (313° to 96°) until after the workpiece has been moved out of the press P1 by a safe distance, but is opened (96° to 313°) as the workpiece starts forward and while it is passing limit switches LS–1, LS–2 carried on each side by rails 70'. The limit switches LS–1, LS–2 are in series with a cancelling switch A5–1 of a handler cam A5 which is opened at about 318° to 329° and is closed at all other times. If a workpiece is being fed and fed evenly at some time before A8–1 opens at 96°, both switches LS–1 and LS–2 will be closed and a workpiece position relay S will be energized. It will lock in past the limit switches on its lock switch S–1 and will also close a switch S–2 which is in parallel with the cam switch A8–1. Either the switch A8–1 or the switch S–2 will energize a flow check relay K. As stated, the switch A8–1 is closed from 313° to 96° and switch S–2 is closed from the time the limit switches are closed (some time prior to 96°) until relay S is deenergized by cam A5 between 318° and 329°. Consequently, if a workpiece has been pulled out correctly, the flow control relay K is kept closed all the time. Relay K has a switch K–1 in the lock-in circuit of the handler.

Similarly, push-in flow control limit switches LS–3 and LS–4 are in series with cancelling switch A5–1 to energize a workpiece position relay R if a workpiece is pushed in properly. Relay R locks in past the limit switches on its lock switch R–1. It also closes a switch R–2 in parallel with a switch A7–1 operated by a handler cam A7. The cam A7 holds its switch A7–1 closed between 307° and 86° to keep a flow check relay J energized. If switch R–2 keeps the relay J energized between 86° and 307°—as it will if a workpiece has been pushed out properly—the relay J will be energized continuously and will keep its switch J–1 in the lock-in circuit closed.

*Handler controls presses*

The pull-out flow control relay K has a switch K–2 in the lock-in circuit of the press P1 so the press can not run unless the workpiece has been taken from it and fed forward properly.

The push-in flow control relay J has a switch J–2 in the lock-in circuit of the press P2 so the press cannot run unless the workpiece has been properly presented to it.

There are other safety provisions between the handler and presses for checking the position of the handler bridge rails and the press ejectors which will be described later. For the moment it will be assumed that these parts are positioned at the proper places at the proper times.

*Run lock-in*

The switches P1–1, P2–1, Z–3, K–1 and J–1 are in series in the circuit of a lock-in relay D. If they are all closed, and if a position-check cam switch A4–1 of a handler cam A4 is closed (closed 285° to 312°), and if a lock-in pushbutton PB–3 is closed, the relay D will be energized. It locks in on its lock switch D–1 past both the pushbutton and cam switch.

*Clutch engaged*

Energization of lock-in relay D also closes a switch D–2 in the circuit of a clutch relay N. There is a switch YT–1 of a time delay relay YT in the circuit of switch D–2 and relay N.

The handler lock-in relay D also has a switch D–3 in the lock circuit of press P1.

Relay YT is energized after a slight time delay after the presses are ready for the server to operate. For example, either press P1 (or both P1 and P2 together if required) may give a starting impulse at a cam switch P1C–1 of cam P1C, or press P2 may give a starting impulse at switch P2C–1 of cam P2C. Closure of either P1C–1 or P2C–1 will energize a relay WT which at once closes its lock switch WT–1 and after a time delay closes a switch WT–2–DC ("DC" meaning a time delay in closing). Closure of WT–2–DC energizes relay YT which at once closes the switch YT–1, referred to above, and after a time delay opens its switch YT–2–TO ("TO" meaning a time delay to open). The opening of YT–2–TO deenergizes both relay YT and relay WT.

When clutch relay N is energized by the closure of YT–1 it closes its lock switch N–1 which is in a line to the hinge side of a swing cam switch A3–1 having a lower contact A3–1A and an upper contact A3–1B. The switch A3–1 is operated by a handler cam A3 which closes A3–1 to A3–1A between about 250° to 320° and closes A3–1 to A3–1B between about 320° to 250°. Shortly after A3–1B is closed the timing switch YT–2–TO opens to deenergize YT and open YT–1 and leaves relay N locked in at its lock switch N–1 and A3–1B. A switch N–2 operated by relay N causes the clutch 53*a*′ to be engaged. When switch A3–1B is opened by the cam A3 at about 250°, the clutch is released and the cycle is over. The carriage moves to its usual stopping point under such inertia as it may have. As stated, the stopping point is approximately at 300°. If the carriage stops somewhat earlier, say at 285°, the operation is not disturbed.

*Carriage pause at each end*

It has been noted above that it is helpful to provide a pause at each end of the carriage stroke. The means herein provided for this purpose comprises a double-lobed cam A1 which closes its switch A1–1 at 141° to 151° and at 330° to 340°. Closure of switch A1–1 energizes a time delay relay HT which at once closes its switch HT–1 and opens its switch HT–2–TC, both at the clutch. The switches HT–1 and HT–2–TC are in parallel with each other but in series with the switch N–2 which remains closed except at the end of a cycle. Relay HT is soon deenergized to open HT–1 and disengage the clutch, and after a time delay HT–2–TC recloses and re-engages the clutch.

*Feed arms operated—programming*

The pull-out arms 96′ are moved back and forth as required by their cylinder-piston devices 97′ through the action of a handler cam A13 which closes its switch A13–1 at about 308° to 168° to energize a valve solenoid 97–VC1 and cause the arms to move outwardly toward the press P1. When the switch A13–1 opens, the arms return to their inboard position. This is a fail-safe condition if the valve solenoid 97–VC1 should fail.

The push-in arms 96′ are similarly operated by a handler cam A14 which closes its switch A14–1 at about 331° to 164° to energize a valve solenoid 97–VC2 to move the arms out toward press P2, the arms being retracted when the switch opens at 164°.

*Article engaging means operated*

The article engaging means, here the suction cups 95′, are energized by supplying air to their injector nozzles 135′ by a valve (or valves) which is opened when a valve solenoid coil 135–VC is energized. The coil is energized by the closure of a cam switch A11–1 at about 324° to 145° by a handler cam A11.

*Carriage and fixed index station guides moved up and down*

Since the carriage and fixed index station guides are moved at the same time but in opposite directions, they are all moved from a single control. A handler cam A12 closes its switch A12–1 at about 320° to 168° and opens it at about 168° to 320°. There is some time lag for the fluid-actuated devices 86′ and 92′ to act so the actual transfer of articles will be made near the ends of the carriage stroke. The linear movement of the carriage will be very small relative to the angular movement of the crankshaft at the ends of the stroke, hence the transfer is easily made.

Closure of switch A12–1 energizes a valve solenoid coil A12–VC to energize the power devices 86′ and 92′ to move the guides in one direction; the valve moves back and the power devices reverse direction when the switch A12–1 is opened. The transfer action of the index guides has already been explained, that is, the carriage rails move up and the fixed station rails move down at 320° and the reverse action occurs at 168°.

*Bridge rail operation—general*

The bridge rails aid the servers, hence are controlled by the servers for their needs; but the rails enter the presses and if not properly withdrawn in time would cause damage, hence they are powered through and partly controlled by the press circuit. The power and control means for the rails are such that when the controls are deenergized the bridge rails are withdrawn from the press and toward the servers in a fail-safe position. Whenever a press is operative the bridge rails on both ends (along the direction of workpiece movement) are operated in and out simultaneously.

Each press has rails on the push-in end and the pull-out end and the rails on both ends of a press are operated simultaneously. The bridge rails on the pull-out end are first needed, hence all rails of a press are caused to be moved out toward the press by the handler on the pull-out end. If there is no handler on the pull-out end, the rails for a press (such as are present) are caused to be moved out toward the press by the handler on the feed-in end. In other words, either handler will cause the rails to be moved out toward the press but the push-in handler would act for this purpose later than would the pull-out handler because it needs them later. If the rails have been moved out by the pull-out-end handler, they will remain out for the push-in handler, the control action given by the push-in handler merely producing no action.

The bridge rails on the push-in end are last needed, hence are caused to be moved back in away from the press by the handler on the push-in end. If there is no handler on the push-in end, then the press will cause the bridge rails (such as are present) to be retracted away from it. In any event, the press will provide the necessary control action to have the rails withdrawn if they have not otherwise been moved away.

*Bridge rail operation on the pull-out end*

A handler cam A16 is provided which closes its switch A16–1 at about 292° to 308° to cause the bridge rails at press P1 to be moved out toward the press. A switch N–3 is placed in the circuit to assure that the handler clutch relay N is energized to close N–3 before the rails can be moved out. The closure of N–3 and A16–1 energizes a press relay FP1 which closes a switch FP1–1 to energize a valve solenoid 76–VC1 to cause the rails to be moved out toward the press. Relay FP1 locks in on its lock switch FP1–2.

The relay FP1 may also be energized by a cam AA17 of a preceding handler which closes its switch AA17–1 at about 80° to 90°. The circuit from either A16–1 or AA17–1 passes through the switch AA18–1 of the preceding handler which is opened at about 173° to 185° by a cam AA18. The opening of AA18–1 therefore will deenergize FP1 and cause the bridge rails to be withdrawn.

A switch P8P1–1 operated by a cam P8P1 of press P1 is normally closed in the circuit of relay FP1 but is opened when the press starts to operate so that the bridge rails will certainly be pulled away from the press if this has not already been done.

*Bridge rail operation on the push-in side*

The controls here are like those just described, considering the handler to be in the same relationship to press P2 that the preceding handler bore to press P1.

There is a handler rail-out cam A17 which at about 37° to 65° closes its switch A17–1 to energize a relay FP2 on press P2, the circuit being made through a normally closed cam switch A18–1 which is opened at about 166° to 178° by a handler cam A18 to retract the rails.

Relay FP2 will have been operated earlier by the closure of a switch AB16–1 of a cam AB16 of a subsequent handler if it is present and operating. A clutch relay switch ABN–3 is in the circuit with switch AB16–1 and is closed when the clutch relay of that handler is energized. The reason for having a clutch relay safety switch in the pull-out end circuit (N–3 or ABN–3) rather than in the push-in end circuit is to insure that the bridge rails will be pushed out promptly after the handler carriage starts toward the press on the pull-out side but not before, even if the cam switch closes earlier.

Relay FP2, when energized, closes a switch FP2–1 to energize a rail projecting valve solenoid 76–VC2.

Relay FP2, when energized, locks in on its relay FP2–2 and is deenergized either when the handler cam switch A18–1 opens or when a press cam switch P8P2–1 is opened by a press cam P8P2.

It is to be noted that if a handler is removed from a press, its cross connections will be provided with suitable jumpers to permit the remaining apparatus to be operated without it.

*Press interference check*

Means are provided on the handler for assuring that the bridge rails are retracted before the press can be operated. The means here shown for press P1 comprises a handler cam A10 which opens its switch A10–1 between about 306° and 62°, leaving it closed between 62° and 306°. In the circuit with A10–1 and the press relay PP1 and start pushbutton P1PB–1 (or lock switch PP1–1) there is a limit switch LS–5 which is closed when the bridge rails have been fully retracted. From the description above it is noted that the preceding handler will cause the bridge rails to begin to retract at about 173°. Therefore, both LS–5 and A10–1 should be closed from about 173° to about 300° when A16–1 (closed at 292°) and N–3 (closed when the handler clutch is engaged at about 300°) cause the rails to move out. During this time (173° to 300°) and after a workpiece has been inserted in the press P1, the guide rails must be retracted or the press P1 cannot be operated. The previous handler, if active, has similar interference checking means AA9, AA9–1 and ALS–6 to assure that the press P1 cannot be operated unless the push-in rails are retracted. When the check switch P5P1–1 of press P1 is opened by its cam P5P1, the relay PP1 will be deenergized to halt press operation if the handler check circuits, just described, and a press lock-in relay switch DP1–1 are not closed.

The interference check means provided for press P2 comprise a handler cam A9 which opens its switch A9–1 between about 95° to 220°, leaving it closed between 220° and 95°. In the circuit with A9–1 there is a limit switch LS–6 which is closed when the bridge push-in rails have been fully retracted. From the description above it is noted that the handler will cause the bridge rails to begin to retract at about 166°. Therefore, both LS–6 and A9–1 will be closed from about 220° (when A9–1 closes) to about 37° (when switch A17–1 closes) or about 300° (when the switches AB16–1 and PBN–3 of the subsequent press are closed) when the bridge rails move out. During this time while a workpiece is being inserted in the press P2, and afterward until the handlers are started again, the guide rails must be retracted or the press P2 cannot be operated. At the press P2 there is a relay PP2 and a start pushbutton PBP2–1 in circuit with LS–6 and A9–1. The subsequent handler has similar safety means AB10, AB10–1 and BLS-5 for press P2. Press P2 also has a check cam P5P2 and switch P5P2–1 and a lock-in relay switch DP2–1.

The press intereference check may not be necessary for automatic press operation since other safety devices are provided, but it is needed for manual operation of the presses.

*Press ejector or indexing operation*

There must be assurance that the press ejector or indexing means or gages of press P1 has been retracted to leave the workpiece resting on the bridge rails when the workpiece is engaged by the suction cups of the pull-out arms; also that the ejector of press P2 is up to receive a workpiece when the push-in arms are retracted and that the ejector is then retracted to seat the workpiece in the press. It is to be noted that the bridge rails on the push-in side are disposed at such an elevation that the workpiece does not strike the ejector as it is pushed in; on the pull-out side the bridge rails stand beneath the bottom of the workpiece and laterally clear of the ejector elements.

For the pull-out side toward press P1, the handler is provided with a rotary cam A15 which opens its switch A15–1 at about 336° to 360° to deenergize a press relay EP1 (if it is energized). The relay EP1, when energized, closes a switch EP–1 to energize a press ejector valve solenoid PEP1–VC. When PEP1–VC is energized, the ejector moves up and when it is deenergized the ejector moves down. A cam switch AA6–1 of a cam AA6 of the previous handler is in series with the handler cam switch A15–1 and is closed when A15–1 is opened.

The press P1 has a cam P7P1 which closes its switch P7P1–1 to energize relay EP1 (through the handler switches which are closed at the time) and raise the ejector when the press ram rises, the relay locking in on EP1–2; and the press also has a cam P6P1 which opens its switch P6P1–1 to cause the ejector to be retracted when required by the press on its downstroke if it has not been retracted by the handlers.

For the push-in side toward press P2, the handler is provided with a rotary cam A6 which closes its switch A6–1 at about 102° to 132° to cause the ejector of P2 to be raised. The handler also has a cam A2 which opens its switch A2–1 at about 192° to 212° to cause the ejector of press P2 to retract while the workpiece is held above the ejector after the rails have been retracted so the workpiece will be deposited on the ejector.

The subsequent handler has a cam AB15 with a switch AB15–1 in series with switch A2–1 so as to cause the ejector to retract at another time when AB15–1 is opened. When A2–1 is opened the switch AB15–1 is closed.

The ejector at press P2 is operated through the action of a valve solenoid PEP2–VC which is energized to raise the ejector when the switch EP2–1 of a relay EP2 is closed. Relay EP2 is energized either when switch A6–1 of the handler is closed (circuit is through A2–1 and AB15–1, which are closed at the time) or when a cam switch P7P2–1 of a cam P7P2 of the press is closed. The relay EP2 locks in on its switch EP2–2. A press cam switch P6P2–1 of a cam P6P2 is opened on the downstroke of the press ram to insure that the ejector has been retracted if it has not been retracted by the handlers.

*Manual operation*

For manual operation a ganged selector switch operator SS is moved from the "AUTO" or automatic position in which it is shown to the "MANUAL" position. In this movement its switch SS–1 is closed to manual; switch SS–2 is opened; switch SS–3 is closed; switch SS–4 is closed; and switch SS–5 is opened. Manual operation is controlled by a pushbutton PB–4 which is ganged with pushbutton PB–3 previously mentioned.

Closure of PB–4 will at once energize relay N to start the handler. The circuit is through the switch A3–1 and its lower contact A3–1B and SS–4. If PB–4 is held in, the handler will operate until cam A3 opens A3–1B and closes A3–1A. This will energize a relay M which closes its switch M–1 to a relay L. Relay L locks in past switch M–1 on its lock switch L–1, that is, it locks in to PB–4. Energization of relay L also opens its normally closed switch L–2 between relay N and switch contact A3–1B and closes its switch L–3 between relay N and switch contact A3–1A.

When cam A3 turns until switch A3–1 shifts back from A3–1A to A3–1B, it will deenergize relay M, and since relay L is holding its contact L–2 open, the clutch relay N will be deenergized. If PB–4 is opened, relay L will be deenergized to allow L–2 to close. Then when PB–4 is again pressed in, the cycle can be repeated.

Relay HT acts just as in the automatic cycle to produce a time delay at each end of the stroke, its action simply superseding the effect of relay N at these points.

The operator, of course, is responsible for seeing that the handler and adjacent presses do not clash in their action during manual operation. The safeguards between presses for bridge rails, ejectors and interference check will continue to be effective unless cut out by jumpers, such jumpers being provided for the purpose so the handler may be put through its actions when separated from the press line.

*Operation of first embodiment*

The operation of the first embodiment will be understandable from the specific description which has been given of the second embodiment. Instead of the operation of the vacuum cups the grippers will be operated; there is no vertical movement of the carriage holding parts; there are no arm projecting means on the pull-out end; and there are no bridge rails on the pull-out end.

Figs. 4 to 7 illustrate the action of the first embodiment.

Figures 4, 5, 6, 7:
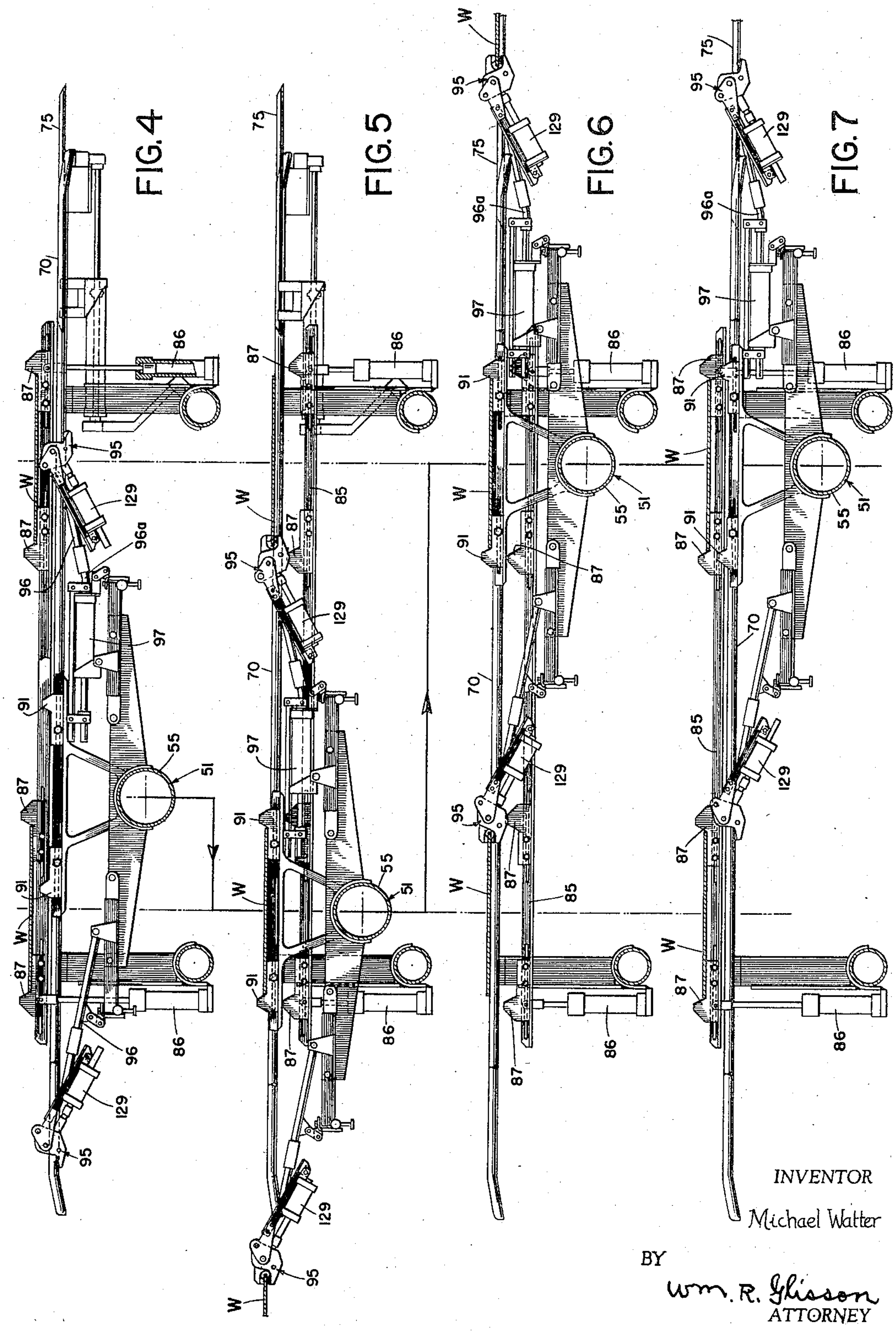
Fig. 4 is a diagrammatic view, similar to Fig. 1 but with parts omitted, to show the parts in the pause or rest position.
Fig. 5 is a diagrammatic view like Fig. 4 but with the carriage at the pull-out end of its stroke.
Fig. 6 is a diagrammatic view like Fig. 4 but with the carriage at the push-in end of its stroke.
Fig. 7 is a diagrammatic view like Fig. 4 but with the carriage in the Fig. 6 position and the workpieces released from their engaging devices.

Fig. 4 shows the rest position at about 300° crankshaft position. A workpiece W is held on each of the fixed station holders 87 above the rails 70 and the jaws 95 are open.

Fig. 5 shows the 0° position where the carriage is at the pull-out end of its stroke. The pull-out grippers and the push-in grippers have engaged workpieces and another workpiece has been lowered until it rests in the guides 91 of the carriage. The fixed station guides 87 have been moved down out of the way. The grippers 95 and arms 96 on the push-in side are in the retracted or inboard position. The bridge rails on the push-in side are still retracted. The bridge rail position here shown, however, is based wholly on the requirements of this particular handler and if the subsequent press on the push-in side has another handler on its pull-out side, that handler will have required that at least the bridge rails on the pull-out side have been extended and, according to the arrangement shown in the wiring diagram, will have caused the bridge rails of the handler on the push-in side to be extended toward the press also.

Fig. 6 shows the 180° position where the carriage is at the push-in end of its stroke. The grippers at both ends still engage the workpieces but are about ready to release them. The grippers and arms on the push-in side are in the extended position.

Fig. 7 shows the same carriage position as Fig. 6, but the grippers have opened to release the workpieces and the fixed station guides 87 have moved up to take two workpieces from the carriage workpiece engaging means (grippers and guides 91) and raise them above the track rails 70. The workpieces are held at such height that the grippers can pass beneath them on the return stroke.

Figures 8, 9, 10, 11, 12, 13, 14, 15:
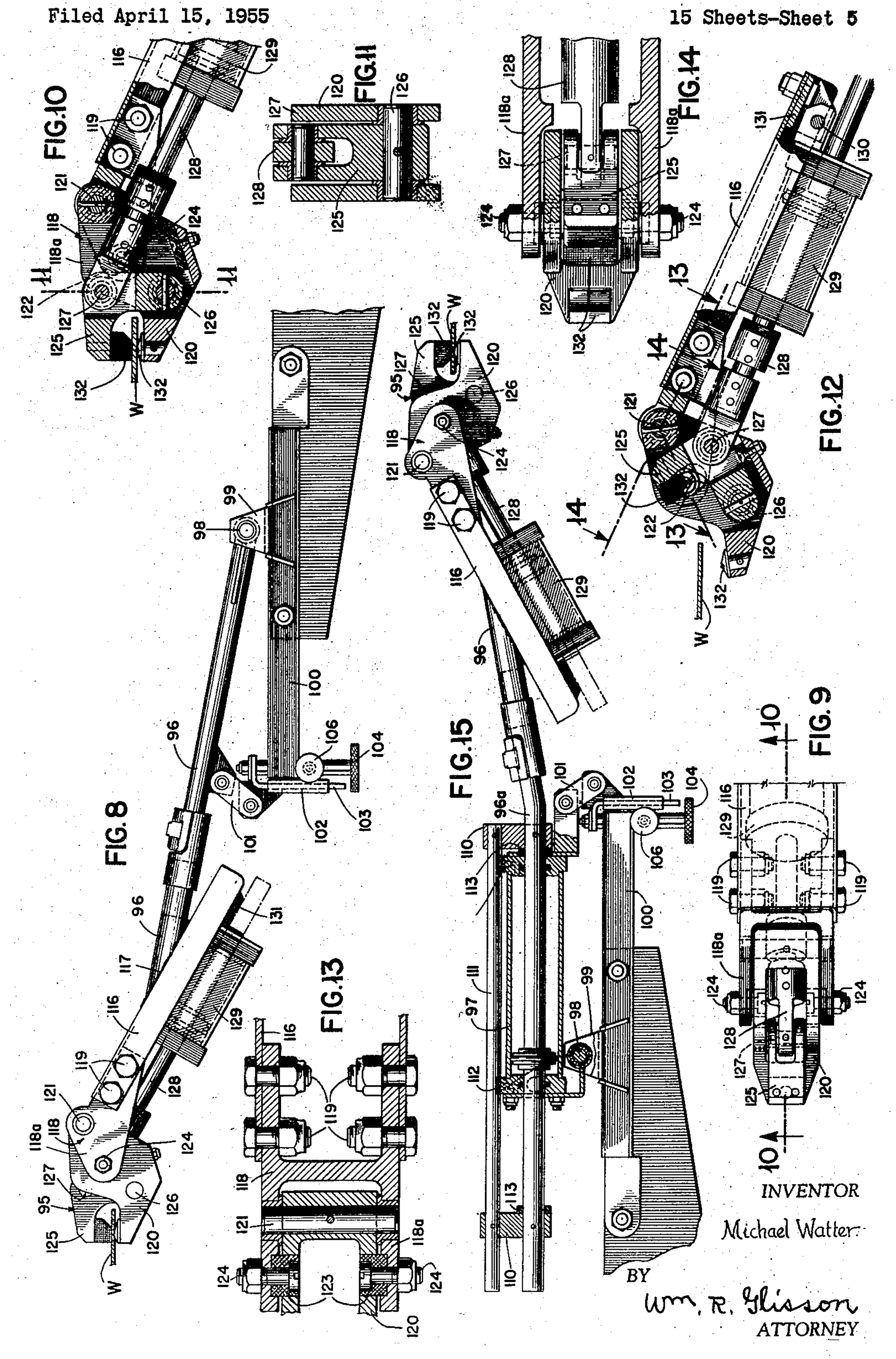
Fig. 8 is a side elevation of a workpiece gripper shown at the left of Fig. 1.
Fig. 9 is a top plan view of the gripper proper shown in Fig. 8.
Fig. 10 is a vertical section taken on the line 10—10 of Fig. 9.
Fig. 11 is a transverse view taken on the line 11—11 of Fig. 10.
Fig. 12 is a view like Fig. 8 but showing the gripper in open position.
Fig. 13 is a section taken on the line 13—13 of Fig. 12.
Fig. 14 is a section taken on the line 14—14 of Fig. 12.
Fig. 15 is a side elevation and section of a workpiece gripper and programming means shown at the right of Fig. 1.
Figure 16:
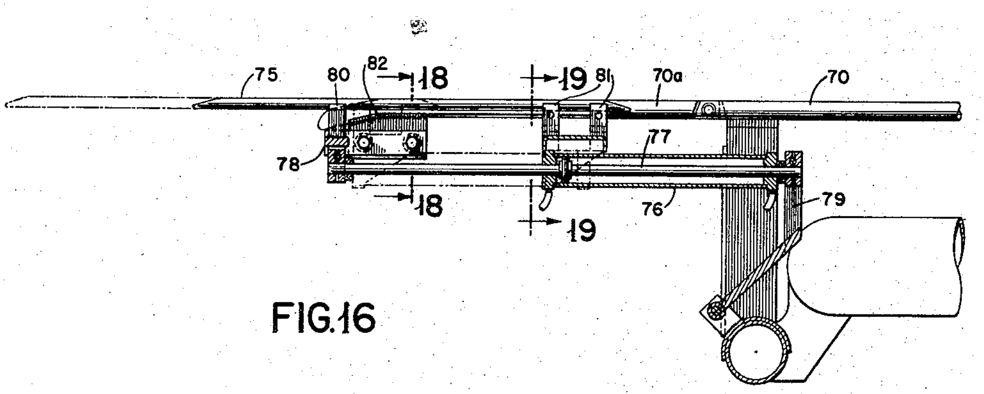
Fig. 16 is a longitudinal side elevation and vertical section of a bridge track and its operating means, the view being taken on the line 16—16 of Fig. 2.
Figure 17:
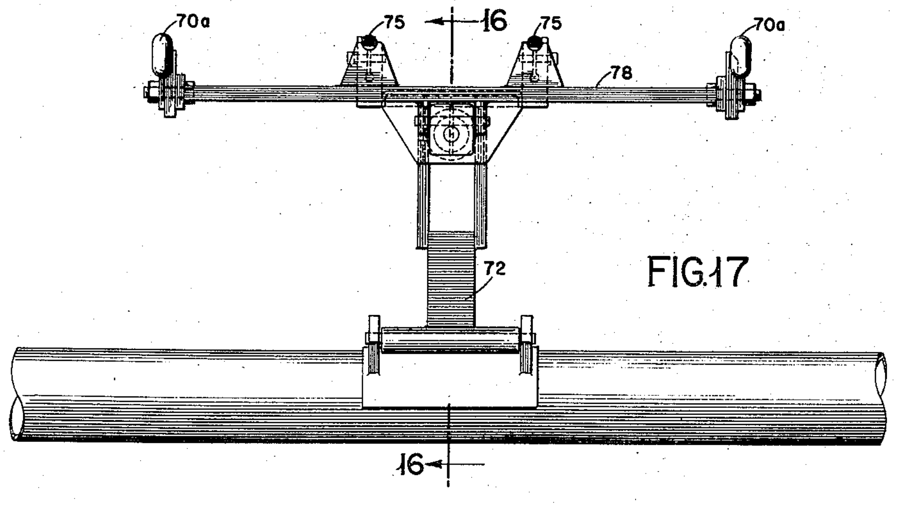
Fig. 17 is a left end elevation of the parts shown in Fig. 16.
Figure 19:
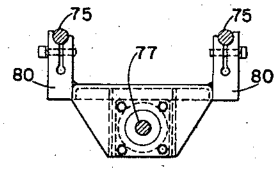
Fig. 19 is an enlarged vertical section taken on the line 19—19 of Fig. 16.
Figure 18:
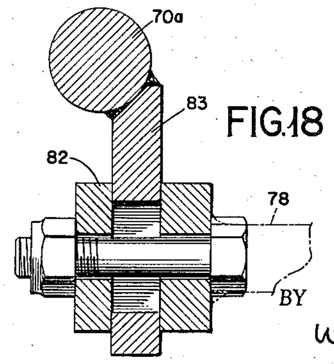
Fig. 18 is a vertical section taken on the line 18—18 of Fig. 16.
Figure 20:
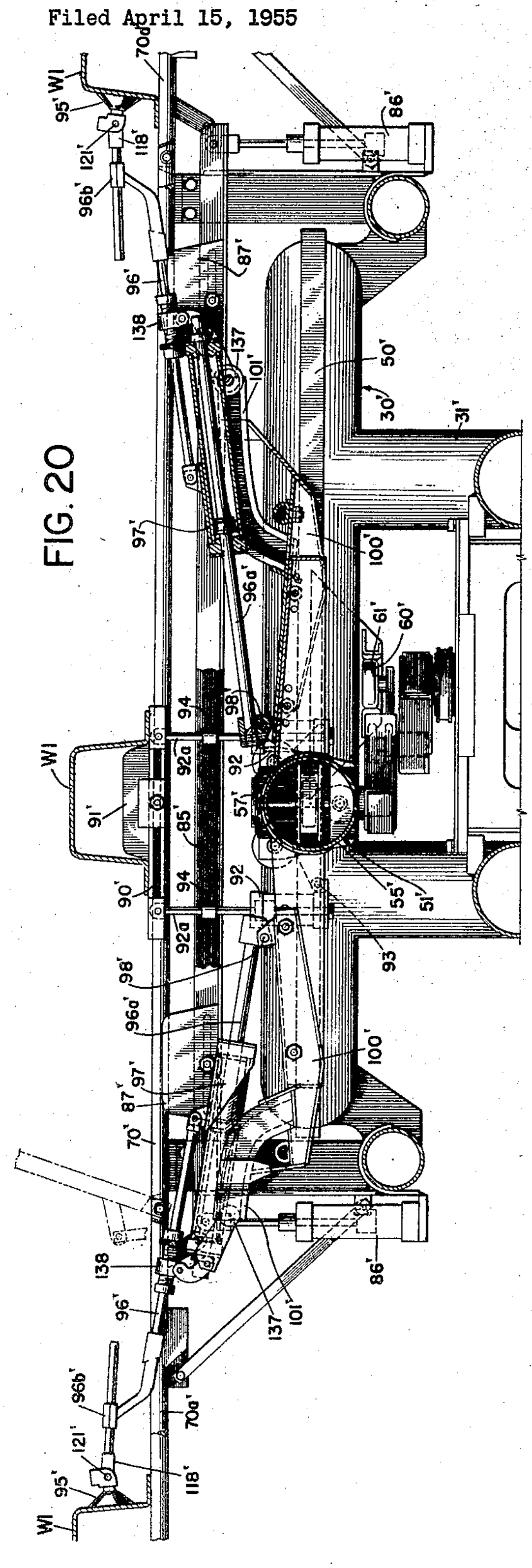
Fig. 20 is a view like Fig. 1 but showing a modification for handling a workpiece of different shape, the view being taken on the line 20—20 of Fig. 21.

Figs. 10 and 12 show the gripper action. In Fig. 12 the upper jaw 125 is open. In this position it moves back to permit the workpiece to be moved up without interference. The lower jaw 120 has dropped down about the pivot 121 until it stands well below the lower surface of the workpiece. In Fig. 10 the jaws have been closed on a workpiece. It will be seen that the upper jaw first engages the top of the workpiece and the further closing action draws the lower jaw upward against the bottom surface of the workpiece. The entire gripper is thus adapted to move about the pivot 121 to meet the height requirements of the workpiece and to follow it along the track rails 70 even though the rail height may vary along the length.

*Operation of second embodiment*

The action of the second embodiment has already been explained by reference to the wiring diagram. The physical positions of the parts can be followed from Figs. 23 to 28.

Fig. 23 shows the rest position at about 300°. The suction cups 95' at the pull-out end are retracted and lowered, the series of shaded image positions to the right showing how the cups moved inboard and downward after the workpiece W1 halted to move back around its flange and beneath it. The cups 95' at the push-in end have retracted and moved down and stand below a workpiece, the movement being shown by shaded images. Two workpieces are being held by the fixed station guides 87'. The carriage guides 91' are in lowered position. The bridging guide rails 75' are shown as having been extended toward the presses. In the dead rest position they are retracted but after the handler start relay N has been energized the switch N–3 will have been closed to cause the bridge rails to move out toward the press.

In Fig. 24 the carriage has moved to the end of its stroke at the pull-out end. The cups 95' at both ends have been extended and in this action have been moved up by the cams 101' into position to engage workpieces. The latter movements of the cups are shown in dotted images. The fixed station guides 87' are moving down and the carriage guides 91' are moving up to entrain a workpiece with the carriage.

In Fig. 25 the fixed position guides 87' have been fully lowered and the carriage guides 91' have been fully raised to entrain a workpiece. In other respects the parts are about in the Fig. 24 position.

In Fig. 26 the carriage is moving with the three entrained workpieces and is about at mid-stroke.

In Fig. 27 the carriage has reached the end of its stroke on the push-in end.

In Fig. 28 the carriage guides 91' have moved down and the fixed position guides 87' have moved up to engage two workpieces on the track rails 70'. The suction cups on the pull-out end are beginning to move inboard and down ready to pass under the workpiece when the carriage moves back. The bridge rails 75' on both ends have been retracted. Shortly after this, the cups on the push-in end will begin to retract and descend ready to pass under a workpiece when the carriage moves back.

*Operation of third embodiment*

The operation of the third embodiment is shown in Figs. 34 to 38.

Figures 34, 35, 36:
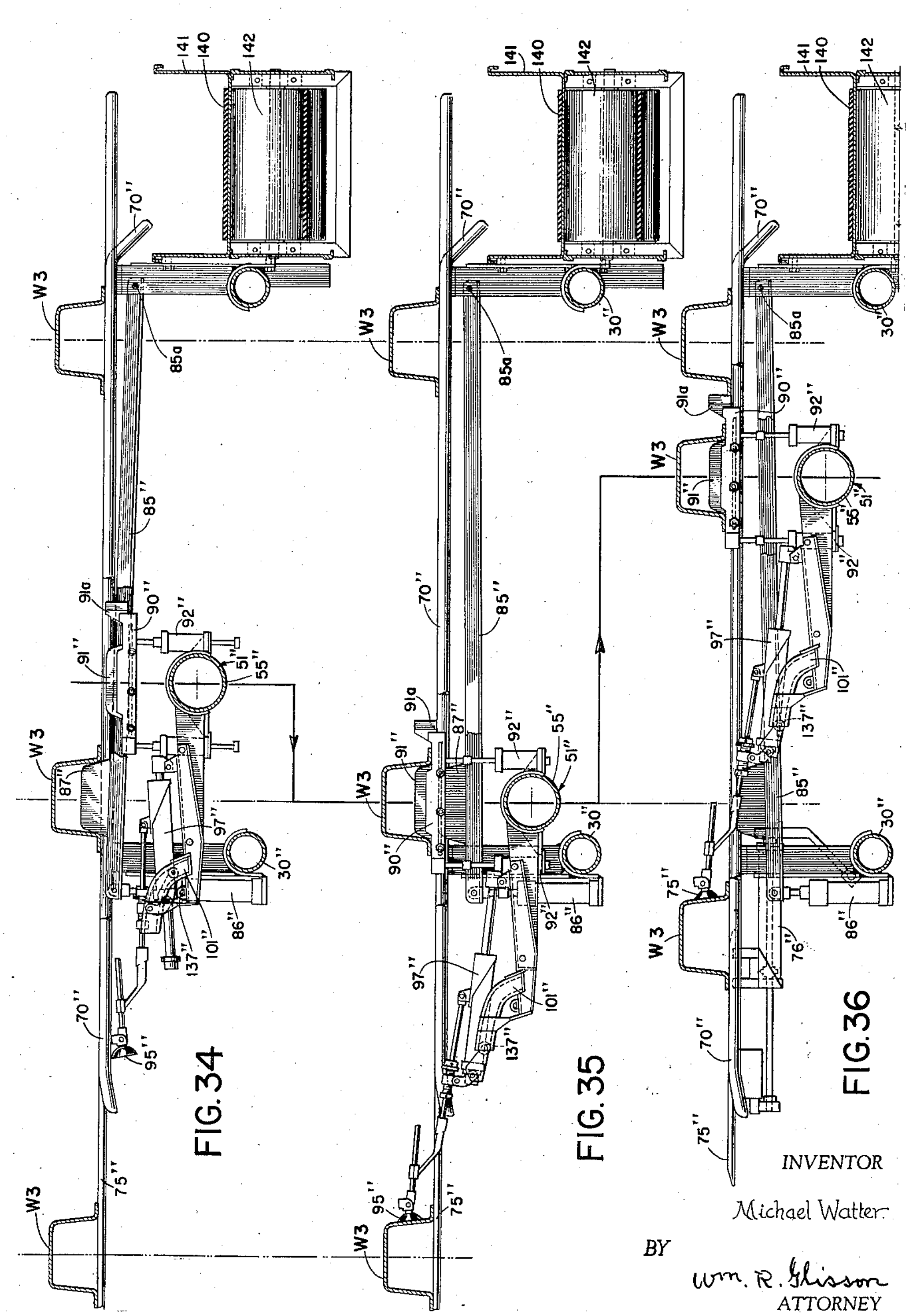
Fig. 34 is a diagrammatic longitudinal section of the machine shown in Fig. 33 with the parts at the rest or pause position.
Fig. 35 is a view like Fig. 34 but showing the parts at the pull-out end of the stroke.
Fig. 36 is a view like Fig. 34 but showing the parts as the carriage approaches the right end of its stroke.

In Fig. 34 the parts at the pull-out end stand in the same position as in Fig. 23 of the second embodiment. The carriage is at about the 300° position; the cups 95'' are retracted; the carriage guides 91'' are down; the fixed position guides 87'' are up holding a workpiece W3, the bars 85'' being swung up about the pivots **85*a*; the bridge rails 75'' are extended outboard toward the press; a workpiece is resting on the rails 70'' ready to be pushed off on the conveyor 140**; and the conveyor is in continuous travel.

In Fig. 35 (corresponding about to Fig. 25) the cups 95'' have moved out and up to engage a workpiece as the carriage reaches the pull-out end of its stroke and the carriage guides 91'' are about to entrain a workpiece.

In Fig. 36 the carriage is approaching the push-off end of its stroke and the pusher elements **91*a* have engaged the workpiece which was resting on the rails 70''. The bridge rails 75''** have been withdrawn (unless the press and prior handler have kept them out along with the push-in rails of the press).

Figure 37:
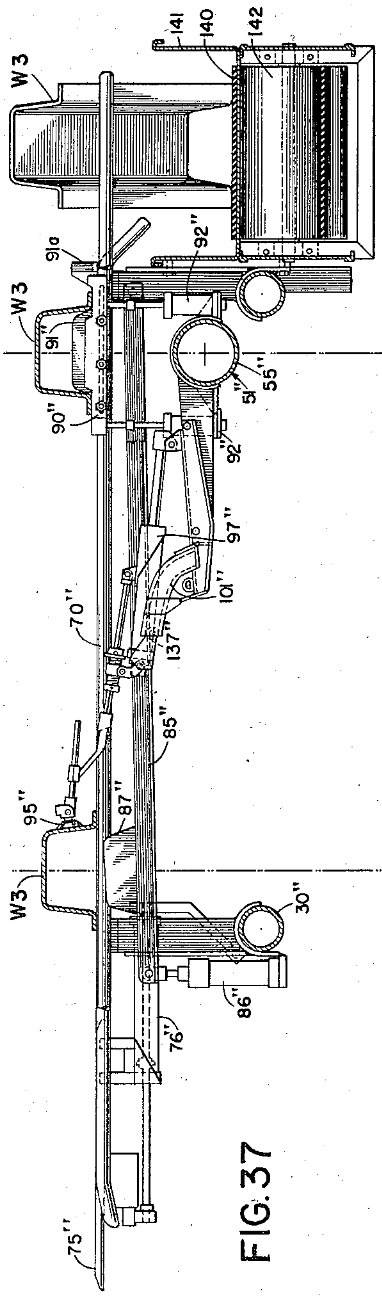
Fig. 37 is a view like Fig. 34 but showing the parts at the right end of the carriage stroke.

In Fig. 37 the carriage has reached the push-off end of its stroke and the pusher elements **91*a* have pushed one end of the workpiece W3 off the short rail 70''. The moving belt 140 will then pull the workpiece off the long rail 70'', that rail serving to keep the workpiece in an upright position. The carriage guides 91'' are about to descend to leave a workpiece on the rails 70'' and the fixed position guides 87''** are about to ascend to engage the other workpiece.

Figure 38:
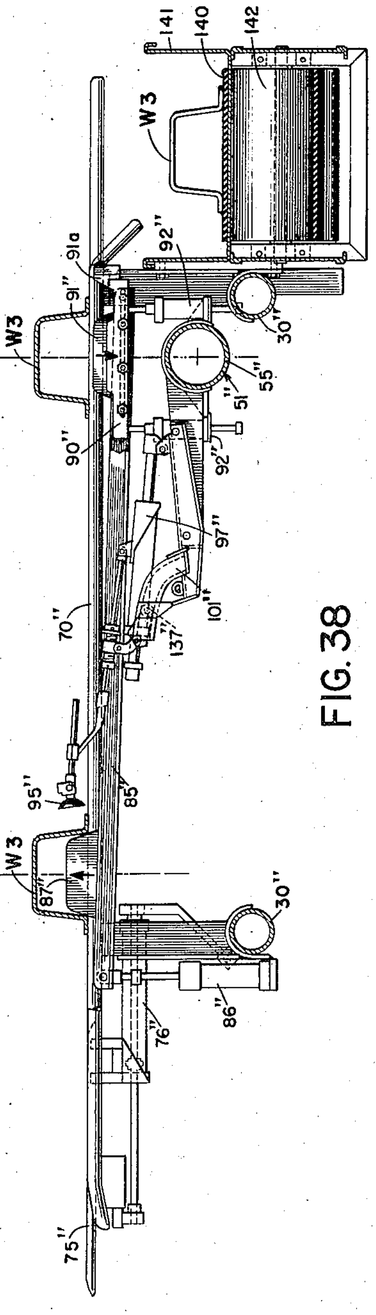
Fig. 38 is a view like Fig. 37 but with the parts released from the carriage, a workpiece passing off on the conveyor belt and a workpiece engaged by the fixed station holding means.

In Fig. 38 the first workpiece has dropped down completely on the belt; the second workpiece is left on the rails 70''; the cups 95'' have begun to move away from the third workpiece; and the fixed position guides 87'' have engaged the third workpiece.

Instead of providing the pusher elements **91*a*, as illustrated, the carriage guides 91''** may be retracted while the carriage is still moving, and in this case the workpiece will slide off the short rail by inertia.

It is thus seen that the invention provides accurate, reliable and durable means for moving articles between shaping machines or fixed stations; that adequate safeguards are provided to prevent interference in action between the serving apparatus and the served machines; that adequate clearance is provided for passage of the workpiece holding means past a workpiece which has been released; the travelling workpiece holders provide full clearance for relative vertical movement with the workpiece as soon as they release it; that effective workpiece entraining means are provided for workpieces which have vertical surfaces to be engaged; that grippers are provided which grip the workpiece securely and provide a considerable range of vertical location of the workpiece; that effective means are provided for handling either flat sheets or deep channel shaped workpieces; that means are provided for bridging the space between machines and handlers; that portable handlers are provided which can be quickly placed and connected to serve machines or which can be as readily removed to leave the machines in fully operable condition without them; and that effective means are provided for finally discharging workpieces to a point of delivery.

By the present apparatus, together with the sheet server like that disclosed in my copending application referred to above, a complete line of presses can be served automatically from start to finish without any operators except for supervisory check and even then the machines will stop and stop safely if proper action is not produced.

The handlers are of such a nature that any one or more of a number in a line may be removed and hand operation substituted for it and the remaining handlers will function with the hand operation, their action being slowed up, however, between cycles to await the "go" signals from the manual operators.

While certain embodiments have been shown by way of illustration, it is to be understood that there may be other modifications and changes within the general scope of the invention.

What is claimed is:

1. Article handling apparatus comprising in combination, a reciprocatory conveyor movable in a first direction and having thereon a plurality of article engaging means along its length for entraining and moving articles with the conveyor, means for at least one of said article-engaging means on the conveyor for moving it under independent control transversely relative to the conveyor and relative to other article-engaging means thereon, and fixed position means at at least one position intermediate the ends of the travel range of the article-engaging means on the conveyor where articles on said reciprocatory conveyor halt, movable in a second and transverse direction to move an article clear of the article engaging means on the conveyor when the reciprocatory conveyor is at one end of its stroke and to return the articles to the conveyor but to different article engaging means along its length when the conveyor is at the other end of its stroke.

2. Article handling apparatus comprising in combination, a reciprocatory conveyor movable in a first direction and having thereon a plurality of article engaging means along its length for entraining and moving articles with the conveyor, fixed position means at at least one position intermediate the ends of the travel range of the article-engaging means on the conveyor where articles on said reciprocatory conveyor halt, movable in a second and transverse direction to move an article clear of the article engaging means on the conveyor when the reciprocatory conveyor is at one end of its stroke and to return the articles to the conveyor but to different article engaging means along its length when the conveyor is at the other end of its stroke, and independently controlled means for each of a plurality of said article engaging means on the reciprocatory conveyor providing movement with an article thereon transverse to the reciprocatory movement of the conveyor.

3. Article handling apparatus comprising in combination, a reciprocatory conveyor movable in a first direction and having a plurality of article engaging means carried by the conveyor at spaced points along its length for entraining and moving articles with the conveyor, fixed position means at at least one position intermediate the ends of the travel range of the article-engaging means on the conveyor where articles on said reciprocatory conveyor halt, movable in a second and transverse direction to move an article clear of the article engaging means on the conveyor when the reciprocatory conveyor is at one end of its stroke and to return the articles to the conveyor but to different article engaging means along its length when the conveyor is at the other end of its stroke, at least one of said article engaging means on the reciprocatory conveyor having independently controlled movement transverse to the reciprocatory movement of the conveyor and carrying articles transversely with it, and means on said conveyor for giving one of said article-engaging means a longitudinal movement beyond the longitudinal movement given by and with the conveyor at one end of the reciprocatory movement of the conveyor.

4. Article handling apparatus comprising in combination, a reciprocatory conveyor movable in a first direction and having at least three article engaging means along its length, fixed position means at at least one position where articles on said reciprocatory conveyor halt, movable to take an article away from an article engaging means on the conveyor when the reciprocatory conveyor is at one end of its stroke and to return the article to the next adjacent article engaging means on the conveyor when it is at the other end of its stroke, and actuating means for an intermediate article engaging means on the conveyor for giving it independent movement with an article thereon transverse to the reciprocatory movement of the conveyor.

5. Article handling apparatus comprising in combination, a handler frame, a reciprocating device mounted on said handler frame, article moving means on said device for engaging articles and moving them through a travel distance caused by the movement of said device, means carried by said reciprocating device for imparting to an article moving means a separate travel movement independently of that imparted by said reciprocating device and also for imparting to an article moving means a movement transversely to the direction of travel supplemental article supporting means carried on said frame at an end of the stroke of the reciprocating device, and means carried by said frame for giving said supplemental article supporting means a longitudinal movement independently of the movement of said reciprocating device at one end of its stroke.

6. Article handling apparatus comprising in combination, a reciprocating carriage having a generally horizontal movement, article engaging and moving means on said carriage adapted to engage an article above its lower edge in moving it, means on said carriage for changing the level of the article engaging means to fit it to the article level on the out stroke of the carriage and for again changing the level of the article engaging means on the in stroke of the carriage, means for holding an article in an elevated position at the end of the in stroke of the carriage, and means for causing the article handling means to continue its horizontal movement after the carriage stops whereby the article handling means moves clear of an article at the inner part of its movement.

7. Article handling apparatus comprising in combination, a reciprocating carriage having a generally horizontal movement, article engaging and moving means on said carriage, means to cause said article engaging means to engage and disengage an article, means for holding an article in an elevated position, means for causing said article engaging means to move in one vertical direction to engage an article on its outward stroke and to move in the reverse vertical direction on its inward stroke, whereby the article handling means will move around one side of an article being held in an intermediate position, and means for giving said article engaging means a secondary horizontal movement independently of said carriage movement after the carriage movement has been halted.

8. Article handling apparatus comprising in combination, a reciprocating carriage having a generally horizontal movement, article engaging and moving means on said carriage, means to cause said article engaging means to engage and disengage an article, means for holding an article in an elevated position, means for causing said article engaging means to move in one vertical direction to engage an article on its outward stroke and to move in the reverse vertical direction on its inward stroke, whereby the article handling means will move around one side of an article being held in an intermediate position, and means for giving said article engaging means a secondary horizontal movement independently of said carriage movement after the carriage movement has been halted, said last-mentioned means causing said article engaging means to move outwardly on the out stroke as the article engaging means moves vertically to engage an article and to move inwardly on the in stroke after the article has been disengaged.

9. Article handling apparatus comprising in combination, a reciprocating carriage having a generally horizontal movement, article engaging and moving means on said carriage, fixed track rails disposed along an intermediate part of the path of movement of said carriage, and fixed station index means having article engaging means movable vertically for exchanging articles on the rails with the article engaging means on said carriage, the article engaging means on the carriage including a pull-out device on one end of the carriage, a push-in device on the other end of the carriage and an intermediate article engaging device which has vertical movement for exchanging articles on the rails with the fixed-station means.

10. Article handling apparatus comprising in combination, a reciprocating carriage, an arm carried by said carriage, a suction cup carried by said arm for engaging the side face of an article to entrain it with said carriage, and means at an inboard position of the article for producing relative lateral movement between the article and suction cup for providing passing movement between the article and suction cup.

11. Apparatus as set forth in claim 10 which includes means for moving said suction cup down relative to the carriage, and means to hold the article above the carriage to permit the suction cup to pass it.

12. Article handling apparatus for serving a machine such as a press, comprising in combination, a handler having a reciprocating device having article-engaging means for moving an article from or toward the machine, fixed rails on the handler for holding an article at a distance from the machine, reciprocable bridge rails mounted on the handler to be moved from and toward the machine, and means carried by the handler for moving said rails independently of but timed with the movement of said reciprocating device for bridging and clearing the space between the fixed rails and said machine as required by said machine.

13. Article handling apparatus for serving a machine such as a press, comprising in combination, a handler having a reciprocating device having article-engaging means for moving an article from or toward the machine, fixed rails on the handler for holding an article at a distance from the machine, reciprocable bridge rails mounted on the handler to be moved from and toward the machine, means carried by the handler for moving said rails independently of but timed with the movement of said reciprocating device for bridging and clearing the space between the fixed rails and said machine as required by said machine, and bridge rail control means conjointly operated by the handler and machine.

14. Article handling apparatus for serving a machine such as a press, comprising in combination, a handler having a reciprocating device having article-engaging means for moving an article from or toward the machine, fixed rails on the handler for holding an article at a distance from the machine, reciprocable bridge rails mounted on the handler to be moved from and toward the machine, and carried by the handler means for moving said rails as required by said machine, said bridge rails being mounted for reciprocation and also being hinged in association with portions of the fixed rails of the handler to fold up for stowage on the handler.

15. Article handling apparatus comprising in combination, a reciprocatory carriage, end article engaging and entraining means on said carriage, means for moving said article engaging means longitudinally and also vertically relative to said carriage, a spaced article holder on said carriage, means for moving said holder vertically relative to the carriage, fixed track rails for holding an article above the carriage, fixed-position article lifting means mounted adjacent and along the length of said fixed track rails, means for moving said fixed-position article lifting means up and down relative to said fixed rails to provide article exchange between the carriage and the fixed rails.

16. Apparatus as set forth in claim 15 in which said fixed position article lifting means comprise bars or rails which are pivoted at one end and swing up and down at the other end with the article lifting means.

References Cited in the file of this patent

UNITED STATES PATENTS

| | | |
|---|---|---|
| 2,314,123 | Butterfield | Mar. 16, 1943 |
| 2,425,362 | Cherry et al. | Aug. 12, 1947 |
| 2,615,558 | Reed | Oct. 28, 1952 |
| 2,650,696 | Gedris | Sept. 1, 1953 |